United States Patent
Sun et al.

(10) Patent No.: US 12,413,344 B2
(45) Date of Patent: Sep. 9, 2025

(54) HYPER FRAME NUMBER (HFN) RESYNCHRONIZATION OF PACKET DATA CONVERGENCE PROTOCOL (PDCP) PROTOCOL DATA UNITS

(71) Applicant: QUALCOMM Incorporated, San Diego, CA (US)

(72) Inventors: Lei Sun, Shanghai (CN); Peng Wu, Shanghai (CN); Arun Prasanth Balasubramanian, San Diego, CA (US); Jason Tan, San Diego, CA (US); Yuyi Li, Shanghai (CN); Vaishakh Rao, San Diego, CA (US); Sivaram Srivenkata Palakodety, San Diego, CA (US); Vishal Dalmiya, San Diego, CA (US); Mariano Iberico Torres, San Diego, CA (US); Shailesh Maheshwari, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/710,586

(22) PCT Filed: Jan. 20, 2022

(86) PCT No.: PCT/CN2022/072900
§ 371 (c)(1),
(2) Date: May 15, 2024

(87) PCT Pub. No.: WO2023/137655
PCT Pub. Date: Jul. 27, 2023

(65) Prior Publication Data
US 2025/0015934 A1 Jan. 9, 2025

(51) Int. Cl.
*H04L 1/1829* (2023.01)
*H04L 47/32* (2022.01)
*H04L 47/34* (2022.01)

(52) U.S. Cl.
CPC .......... *H04L 1/1832* (2013.01); *H04L 1/1841* (2013.01); *H04L 1/1854* (2013.01); *H04L 47/32* (2013.01); *H04L 47/34* (2013.01)

(58) Field of Classification Search
None
See application file for complete search history.

(56) References Cited

U.S. PATENT DOCUMENTS

2019/0254115 A1  8/2019  Baek et al.

FOREIGN PATENT DOCUMENTS

| CN | 102484585 A | 5/2012 |
| CN | 107786506 A | 3/2018 |

(Continued)

OTHER PUBLICATIONS

International Search Report and Written Opinion—PCT/CN2022/072900—ISA/EPO—Oct. 11, 2022.

*Primary Examiner* — Guerrier Merant
(74) *Attorney, Agent, or Firm* — Loza & Loza, LLP

(57) ABSTRACT

Aspects of the present disclosure provide mechanisms for fast hyper frame number (HFN) resynchronization of Packet Data Convergence Protocol (PDCP) Protocol Data Units (PDUs). A wireless communication device (e.g., a PDCP entity at a wireless communication device) can calculate a current PDCP count of a current PDCP PDU of a plurality of PDCP PDUs received from a radio link control (RLC) sublayer based on a PDCP sequence number (SN) of the current PDCP PDU and an HFN of a first missing PDCP PDU after a successfully received PDCP PDU. The PDCP count may be calculated using the HFN of the first missing (Continued)

PDCP PDU in response to a gap between the PDCP count of the first missing PDCP PDU and the actual PDCP count of the current PDCP PDU being greater than a PDCP window size.

30 Claims, 19 Drawing Sheets

(56) References Cited

FOREIGN PATENT DOCUMENTS

| | | |
|---|---|---|
| CN | 111510278 A | 8/2020 |
| WO | 2017039912 | 3/2017 |

HYPER FRAME NUMBER (HFN) RESYNCHRONIZATION OF PACKET DATA CONVERGENCE PROTOCOL (PDCP) PROTOCOL DATA UNITS

CROSS-REFERENCE TO RELATED APPLICATION(S)

This application is the U.S. national stage of PCT patent application number PCT/CN2022/072900 filed on Jan. 20, 2022.

TECHNICAL FIELD

The technology discussed below relates generally to wireless communication systems, and more particularly, to processing of Packet Data Convergence Protocol (PDCP) protocol data units (PDUs).

INTRODUCTION

In 3rd Generation Partnership Project (3GPP) standards, the Packet Data Convergence Protocol (PDCP) sublayer is located in the radio protocol stack in both the Long Term Evolution (LTE) and New Radio (NR) air interface on top of the Radio Link Control (RLC) sublayer. The PDCP sublayer provides various services, such as transfer of user and control plane data, header compression, ciphering, and integrity protection. The RLC sublayer provides various services, such as segmentation and reassembly of upper layer data packets, duplicate packet detection, and retransmission of lost data packets.

In both 5G New Radio (NR) standalone networks and non-standalone networks with Evolved-Universal Terrestrial Radio Access New Radio dual connectivity (EN-DC), PDCP reordering may be enabled to allow out-of-order delivery of PDCP PDUs from the PDCP sublayer to upper layers.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device configured for wireless communication includes a memory and a processor coupled to the memory. The processor and the memory can be configured to receive a plurality of packet data convergence protocol (PDCP) protocol data units (PDUs) from a radio link control (RLC) sublayer, each of the plurality of PDCP PDUs including a respective PDCP sequence number (SN), and calculate a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

Another example provides a method for wireless communication at a wireless communication device. The method includes receiving a plurality of packet data convergence protocol (PDCP) protocol data units (PDUs) from a radio link control (RLC) sublayer, each of the plurality of PDCP PDUs including a respective PDCP sequence number (SN), and calculating a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

Another example provides a wireless communication device configured for wireless communication. The wireless communication device includes means for receiving a plurality of packet data convergence protocol (PDCP) protocol data units (PDUs) from a radio link control (RLC) sublayer, each of the plurality of PDCP PDUs including a respective PDCP sequence number (SN), and means for calculating a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

Another example provides a non-transitory computer-readable medium having stored therein instructions executable by one or more processors of a wireless communication device to receive a plurality of packet data convergence protocol (PDCP) protocol data units (PDUs) from a radio link control (RLC) sublayer, each of the plurality of PDCP PDUs including a respective PDCP sequence number (SN), and calculate a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
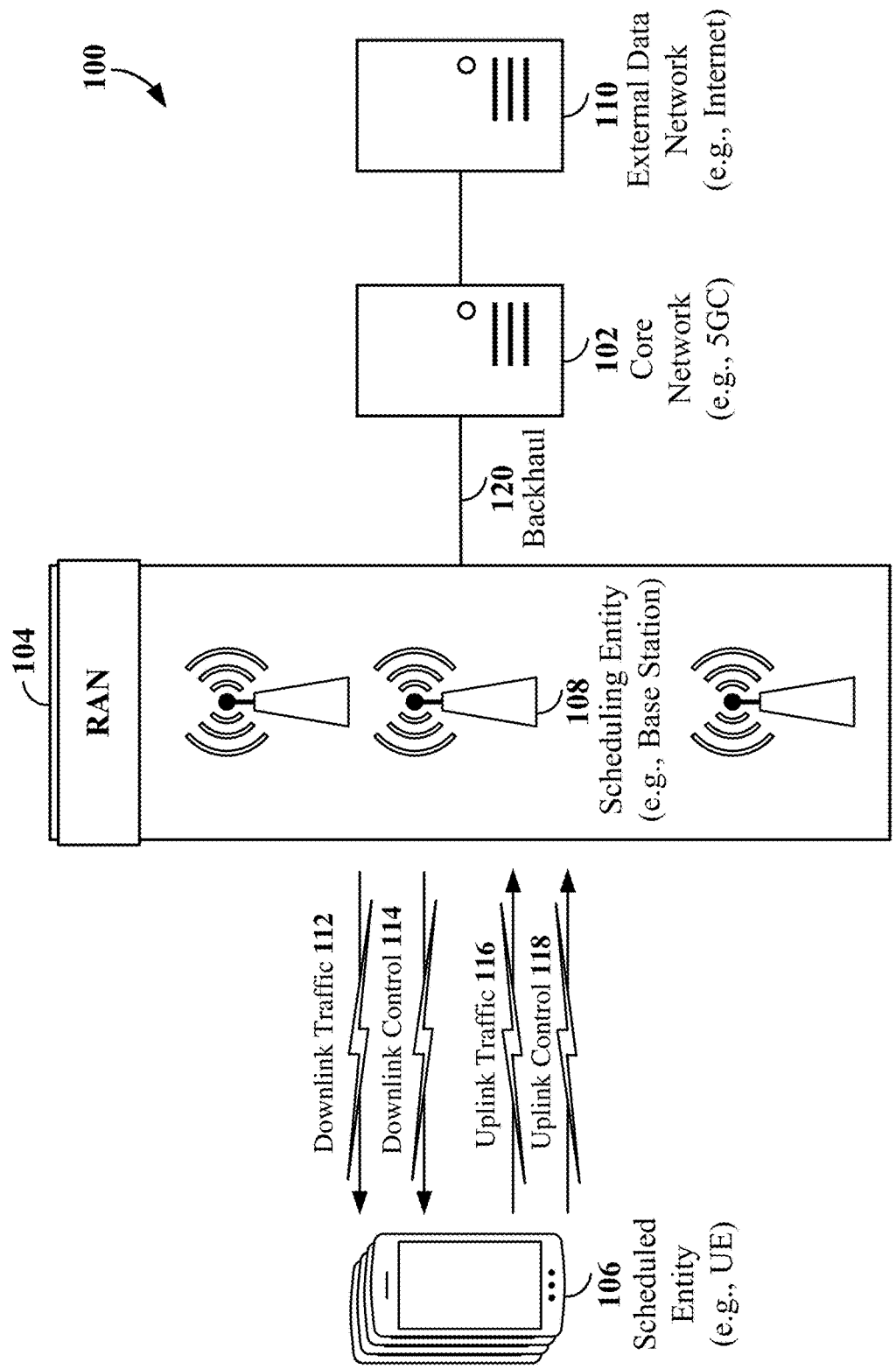
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure provide mechanisms for fast hyper frame number (HFN) resynchronization of Packet Data Convergence Protocol (PDCP) Protocol Data Units (PDUs). A wireless communication device (e.g., a PDCP entity at a wireless communication device) or a radio access network (RAN) node (e.g., a PDCP entity at a RAN node) can calculate a current PDCP count of a current PDCP PDU of a plurality of PDCP PDUs received from a radio link control (RLC) sublayer based on a PDCP sequence number (SN) of the current PDCP PDU and an HFN of a first missing PDCP PDU after a successfully received PDCP PDU. The PDCP count may be calculated using the HFN of the first missing PDCP PDU in response to a gap between the missing PDCP count of the first missing PDCP PDU and the actual PDCP count of the current PDCP PDU being greater than a PDCP window size.

In examples in which the wireless communication device is operating in a NR standalone mode, the current PDCP count may be calculated based on the HFN of the first missing PDCP PDU and a quotient of an RLC SN gap between the successfully received PDCP PDU and the current PDCP PDU and the PDCP window size. In some examples, the gap corresponds to an RLC SN gap between the respective RLC SNs of the first missing PDCP PDU and the current PDCP PDU. If the current PDCP count of the current PDCP PDU is greater than or equal to the missing PDCP count of the first missing PDCP PDU, the wireless communication device can perform a deciphering operation on the current PDCP PDU using the current PDCP count. Otherwise, the wireless communication device can calculate a new PDCP count of the current PDCP PDU. If the new PDCP count of the current PDCP is greater than or equal to the missing PDCP count of the first missing PDCP PDU, the wireless communication device can perform a deciphering operation on the current PDCP PDU using the new PDCP count. Otherwise, the wireless communication device can discard the current PDCP PDU.

In examples in which the wireless communication device is operating in a dual connectivity (e.g., EN-DC) mode, the wireless communication device can receive a plurality of PDCP PDUs including a first subset of PDCP PDUs associated with a first radio access technology (RAT) and a second subset of PDCP PDUs associated with a second RAT, and maintain a respective HFN (e.g., a first HFN and a second HFN) for each radio access technology (RAT). In an example, the current PDCP PDU may be within the first subset of PDCP PDUs. In this example, the wireless communication device can update a current HFN of the current PDCP PDU to the first HFN and calculate the current PDCP count of the current PDCP PDU based on the first HFN and the PDCP SN of the current PDCP PDU. If the current PDCP count is greater than or equal to the missing PDCP count of the first missing PDCP PDU, the wireless communication device can then perform a deciphering operation on the current PDCP PDU based on the current PDCP count. Otherwise, the wireless communication device can update the current HFN of the current PDCP PDU to the second HFN and calculate a new PDCP count of the current PDCP PDU based on the second HFN and the PDCP SN of the current PDCP PDU. If the new PDCP count is greater than or equal to the missing PDCP count, the wireless communication device can perform a deciphering operation on the current PDCP PDU. Otherwise, the current PDCP PDU may be discarded. In addition, if the current PDCP PDU is not discarded, the wireless communication device can update the first HFN with the current HFN of the current PDCP PDU.

In some examples, the wireless communication device can calculate an initial PDCP count of the current PDCP PDU and perform a deciphering operation on the current PDCP PDU based on the initial PDCP PDU when the initial PDCP count is greater than or equal to the missing PDCP count. Otherwise, the wireless communication device can calculate the current PDCP count of the current PDCP PDU. The wireless communication device can further discard the current PDCP PDU in response to failure of the deciphering operation.

The above-described fast HFN resynchronization mechanisms can avoid HFN mismatch, thus reducing deciphering failure and PDCP PDU discards. As a result, the number of call drops may be reduced.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (CUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station. In addition, one or more of the base stations may have a disaggregated configuration.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmissions. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
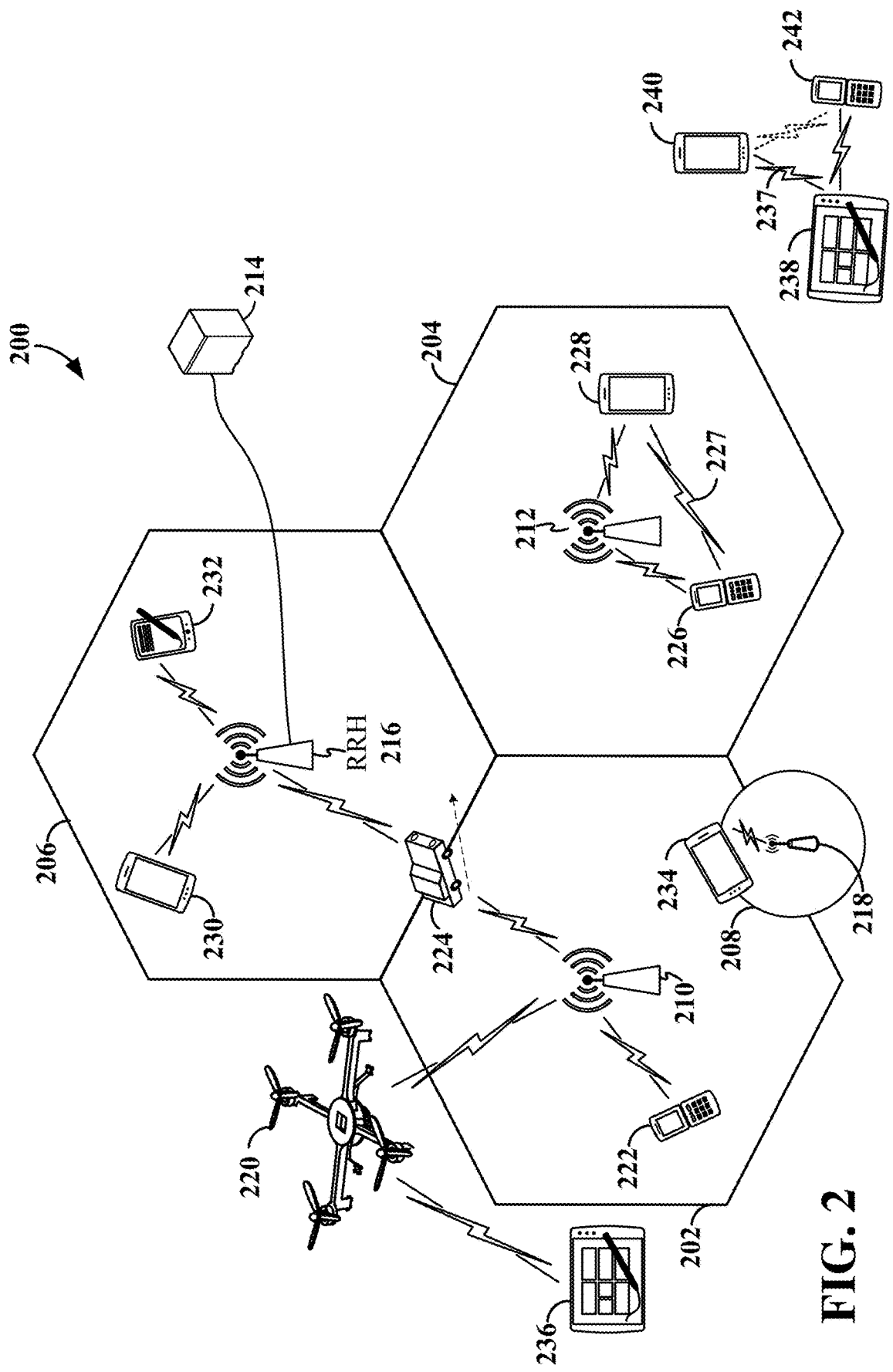
FIG. 2 is a diagram illustrating an example of a radio access network (RAN) according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum often is subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
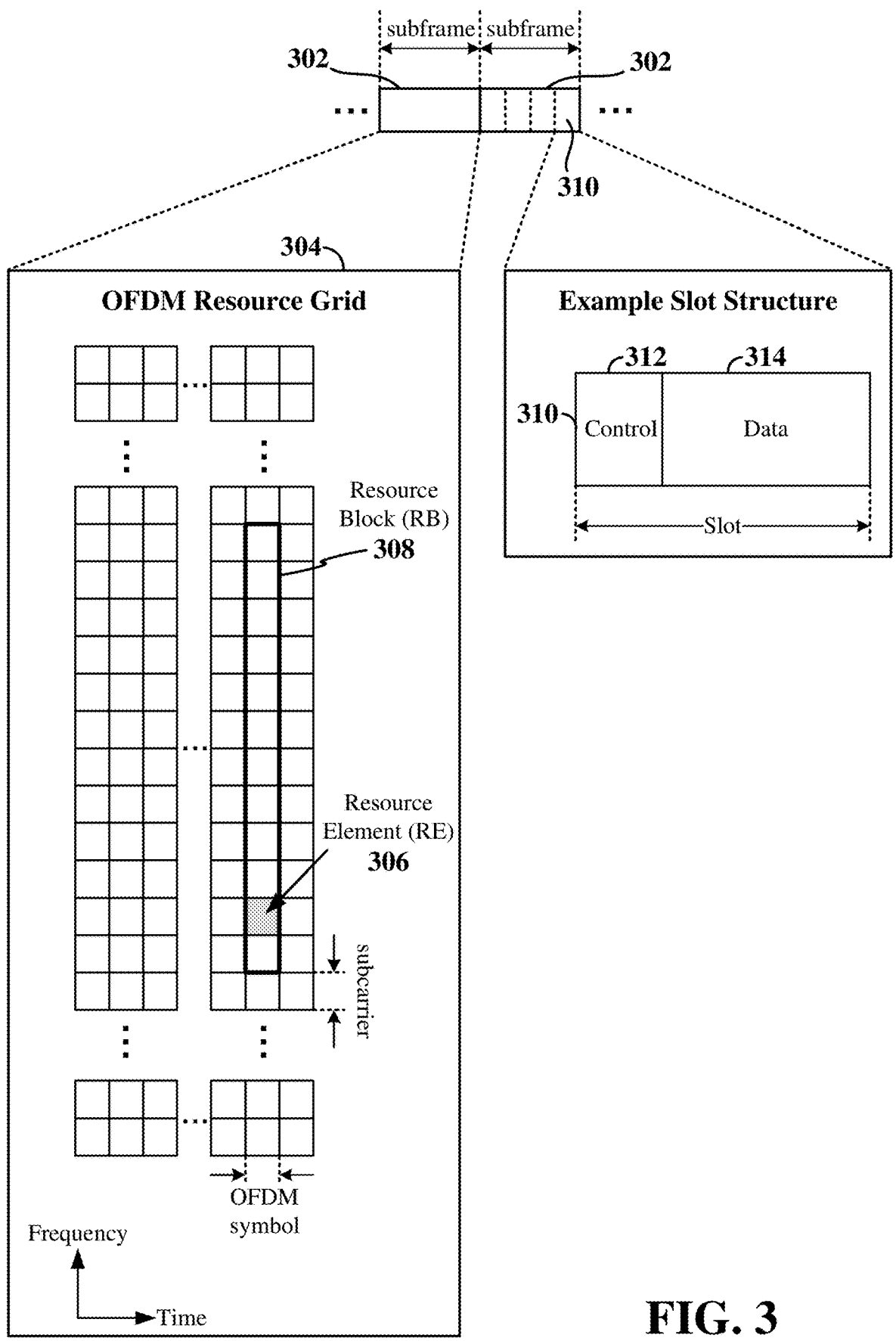
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

NR 5G wireless communication systems may support one or more frequency ranges, including FR1, FR2 or a legacy LTE frequency range. For example, the LTE frequency range may include the E-UTRA frequency bands between 350 MHz and 3.8 GHz. In some examples, each cell may support a single frequency range (e.g., FR1, FR2 or legacy LTE) and may further support one or more frequency bands (e.g., carrier frequencies) within a particular frequency range. In addition, one or more cells may operate as anchor cells enabling dual connectivity with neighbor cell(s) supporting a different frequency range. In some examples, one or more cells may be NR dual connectivity (NR DC) cells that support dual connectivity between FR1 and FR2 (e.g., FR1+FR2 DC). For example, a NR DC anchor cell may be configured for communication with UEs in the cell over FR1, and may further support dual connectivity by the UEs to enable simultaneous communication over FR1 with the NR DC anchor cell and over FR2 with one or more neighbor NR cells. In other examples, one or more cells may be Evolved-Universal Terrestrial Radio Access New Radio dual connectivity (EN-DC) that support dual connectivity between an LTE frequency band and either FR1 or FR2, as described in more detail below in connection with FIG. 5.

For example, an LTE anchor cell may be configured for communication with UEs in the cell over an LTE frequency band, and may further support dual connectivity by the UEs to enable simultaneous communication over the LTE frequency band with the LTE anchor cell and over either FR1 or FR2 with one or more neighbor NR cells.

Figure 4:
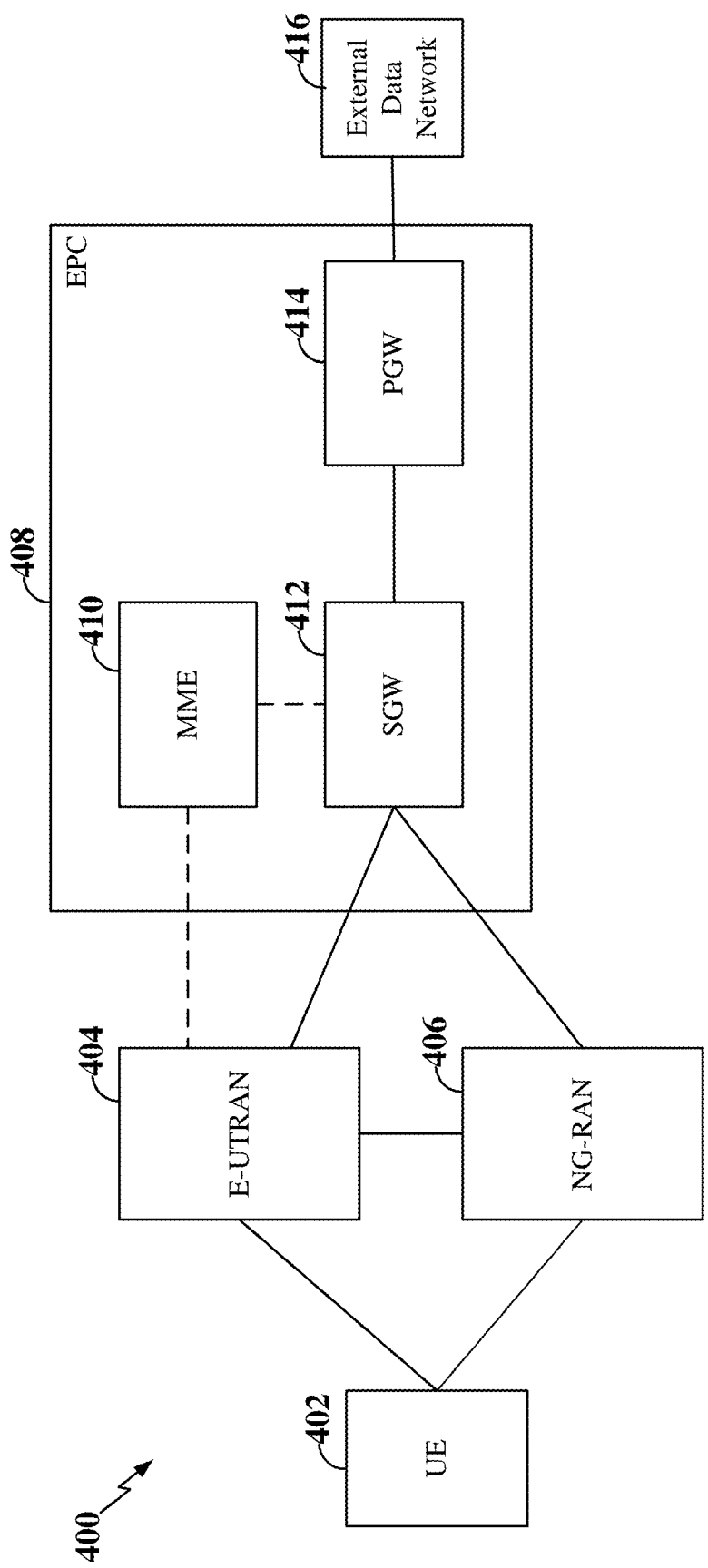
FIG. 4 is a block diagram illustrating an example of an EN-DC system according to some aspects.

Referring now to FIG. 4, by way of example and without limitation, a block diagram illustrating an example of various components of an EN-DC system 400 is provided. In some examples, the EN-DC system 400 may be the same wireless communication system 100 described above and illustrated in FIG. 1. The EN-DC system 400 includes a user equipment (UE) 402, a NG-RAN 406 (e.g., a gNB), an LTE RAN (E-UTRAN) 404 (e.g., an eNB), and a core network 408. By virtue of the wireless communication system 400, the UE 402 may be enabled to carry out data communication with an external data network 416, such as (but not limited to) the Internet, Ethernet network, or a local area network.

The core network 408 may be an Evolved Packet Core (EPC) and may include, for example, a mobility management entity (MME) 410, a serving gateway (SGW) 412 and a packet data network gateway (PGW) 414. The MME 410 is the control node that processes the signaling between the UE 402 and the EPC 408. Generally, the MME 410 provides bearer and connection management for the UE 402 according to mechanisms defined for the EPC 408. For example, the MME 410 may manage security when the UE 402 connects to the E-UTRAN 404 by using information provided by a Home Subscriber Server (HSS, not shown) to authenticate UEs and update UEs location information in the HSS. The MME 410 may further maintain the tracking area identity (TAI) of the current tracking area (e.g., group of neighboring cells/eNBs) within which the UE 402 is located to enable paging of the UE 402 when the UE is in idle mode. Moreover, the MME 410 may manage connectivity via Packet Data Network (PDN) connections between the UE 402 and the PGW 414, and determine and provide a set of Quality of Service (QOS) parameters to the E-UTRAN 404.

To establish a connection to the EPC 408 via the E-UTRAN 404, the UE 402 may transmit a registration request and PDN session establishment request to the EPC 408 via the E-UTRAN 404. The MME 410 may process the registration request and PDN session establishment request and establish a PDN session between the UE 402 and the external DN 416 via the SGW 412 and PGW 414.

To enable dual connectivity, the 4G LTE infrastructure (e.g., E-UTRAN ENB 404 and EPC 408) supports a connection to the NG-RAN 406 (e.g., a 4G NR gNB). Here, the NG-RAN gNB 406 connects to the EPC 408 at the data plane level through the SGW 412. The NG-RAN gNB 406 does not connect to the MME 410, and as such, does not have a control plane connection to the EPC 408. The NG-RAN gNB 406 connects to the E-UTRAN eNB 404 to activate and deactivate 4G bearers. Therefore, the NG-RAN eNB acts as an anchor or master node and the NG-RAN gNB acts as a secondary node. Here, the E-UTRAN eNB 404 may be configured for communication with the UE 402 using an LTE frequency band, while the NG-RAN gNB 406 may be configured for communication with the UE 402 using a NR frequency band (e.g., FR1 or FR2).

In an example, after the UE 402 camps on to the E-UTRAN eNB 404, the UE can signal to the EPC 408 (e.g., the MME 410), that the UE 402 is capable of simultaneous connection to both the E-UTRAN 404 and NG-RAN 406. The MME 410 confirms that the UE 402 is authorized for dual connectivity and notifies the E-UTRAN CNB 404 that the UE 402 is permitted to connect to the NG-RAN 406. The E-UTRAN eNB 404 may then communicate with the NG-RAN gNB 406 to activate a bearer on the NG-RAN gNB 406. The UE 402 can then receive a radio resource control (RRC) reconfiguration message assigning the 5G bearer to the UE 402. The UE 402 can then access the NG-RAN gNB 406 using a random access procedure to establish simultaneous dual connectivity to both the E-UTRAN eNB 404 and NG-RAN gNB 406. Additional secondary nodes (e.g., other gNBs) may also be added using a similar procedure.

Figure 5:
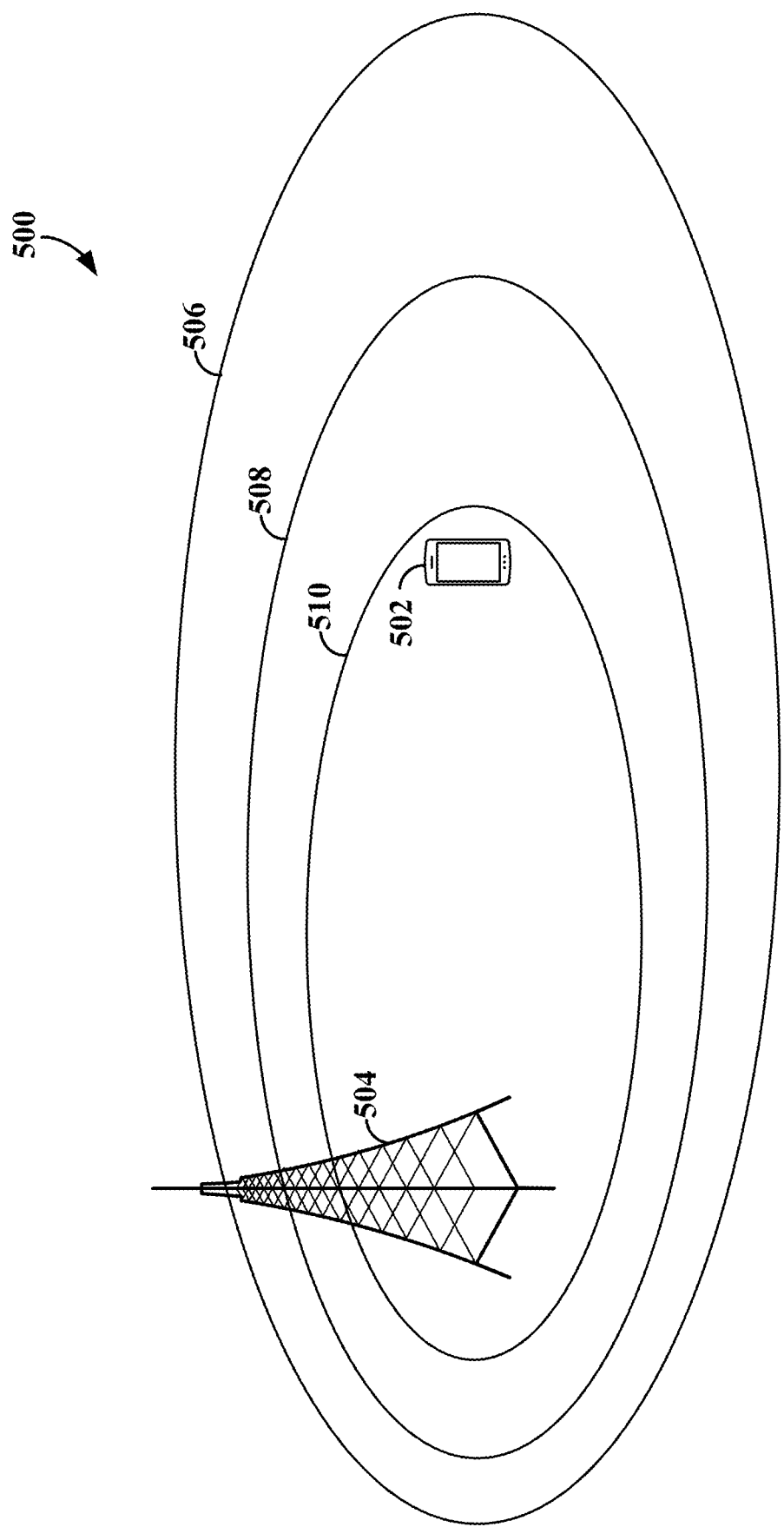
FIG. 5 is a diagram illustrating a multi-RAT deployment environment according to some aspects.

FIG. 5 is a diagram illustrating a multi-RAT deployment environment 500 according to some aspects. In the multi-RAT deployment environment 500 shown in FIG. 5, a UE 502 may communicate with a base station 504 using one or more of a plurality of RATs. For example, the base station 504 may include a plurality of co-located TRPs, each serving a respective cell 506, 508, and 510. Each cell 506, 508, and 510 may communicate using a respective RAT and corresponding frequency range. In some examples, the RATs may include LTE and NR. For example, a first cell 506 may be an LTE cell that operates in an LTE frequency range to provide wide area coverage to the UE 502. In addition, a second cell 508 may be a NR cell that operates in a sub-6 GHz frequency range (e.g., FR1), and a third cell 510 may be a NR cell that operates in a mmWave frequency range (e.g., FR2 or higher).

In some examples, the UE 502 may communicate with the base station 504 over two or more of the cells 506, 508, and 510 in a multi-RAT dual connectivity (MR-DC) mode, such as EN-DC, as described above. EN-DC may be utilized in a non-standalone (NSA) mode of 5G NR in which the UE 502 is simultaneously connected to both LTE and NR or to LTE for the control plane and NR for the user plane. In EN-DC, the LTE cell (e.g., cell 506) may be referred to as the anchor cell that provides a radio resource control (RRC) connection to the UE 502. The anchor cell 506 may activate or add one or more additional NR cells (e.g., cells 508 and/or 510) to provide 5G services to the UE 502. In an example, the UE 502 may simultaneously communicate with the LTE anchor cell 506 over an LTE frequency band and with one or more neighbor NR cells (e.g., cells 508 and/or 510) over FR1 and/or FR2.

In other examples, the UE 502 may communicate with the base station 504 in a NR standalone (SA) mode in which LTE is not utilized as the anchor cell. For example, the UE 502 may communicate with the base station 504 in a NR DC mode. As described above, NR DC mode supports dual connectivity between FR1 and FR2 (e.g., FR1+FR2 DC). For example, a UE 502 may be configured for simultaneous communication with an NR anchor cell 508 over FR1 and with one or more neighbor NR cells (e.g., cell 510) over FR2. In other examples, the UE 502 may be configured to communicate over a single one of the NR cells (e.g., cell 508 or 510) using FR1 or FR2.

Figure 6:
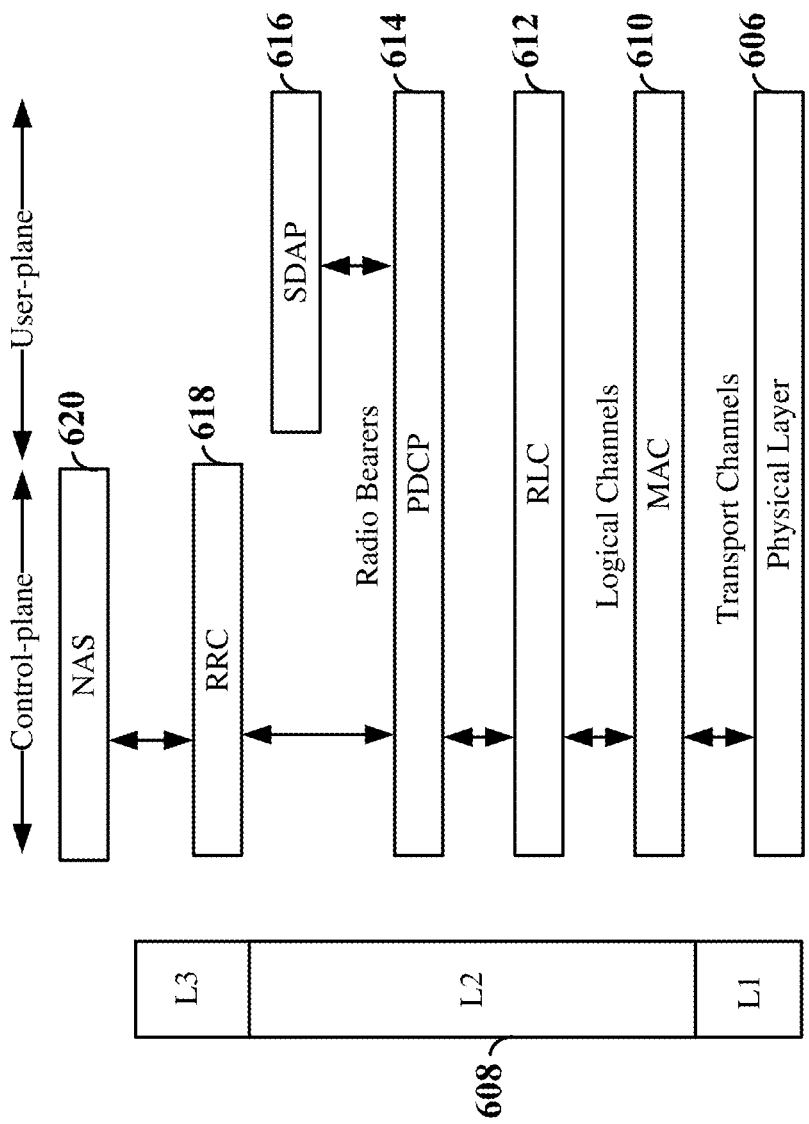
FIG. 6 is a diagram illustrating an example of a radio protocol architecture for the user and control plane according to some aspects.

The radio protocol architecture for a radio access network, such as the radio access network 104 shown in FIG. 1, the radio access network 200 shown in FIG. 2, and/or the radio access networks 404 and 406 shown in FIG. 4 may take on various forms depending on the particular application. An example for a NR radio access network will now be presented with reference to FIG. 6. FIG. 6 is a conceptual diagram illustrating an example of the radio protocol architecture for the user and control planes.

As illustrated in FIG. 6, the radio protocol architecture for the UE and the base station includes three layers: layer 1 (L1), layer 2 (L2), and layer 3 (L3). L1 is the lowest layer and implements various physical layer signal processing functions. L1 will be referred to herein as the physical layer 606. L2 608 is above the physical layer 606 and is responsible for the link between the UE and base station over the physical layer 606.

In the user plane, the L2 layer 608 includes a media access control (MAC) sublayer 610, a radio link control (RLC) sublayer 612, a packet data convergence protocol (PDCP) 614 sublayer, and a service data adaptation protocol (SDAP) sublayer 616, which are terminated at the base station on the network side. Although not shown, the UE may have several upper layers above the L2 layer 608 including at least one network layer (e.g., IP layer and user data protocol (UDP) layer) that is terminated at the User Plane Function (UPF) on the network side and one or more application layers.

The SDAP sublayer 616 provides a mapping between a 5G core (5GC) quality of service (QOS) flow and a data radio bearer and performs QoS flow ID marking in both downlink and uplink packets. The PDCP sublayer 614 provides packet sequence numbering, in-sequence or out-of-sequence delivery of packets, retransmission of PDCP protocol data units (PDUs), re-ordering of received PDCP PDUs, and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP sublayer 614 also provides header compression for upper layer data packets to reduce radio transmission overhead, security by ciphering/deciphering the data packets, and integrity protection of data packets. A PDCP context may indicate whether PDCP duplication is utilized for a unicast connection.

The RLC sublayer 612 provides segmentation and reassembly of upper layer data packets, error correction through automatic repeat request (ARQ), duplicate packet detection, and sequence numbering independent of the PDCP sequence numbering. An RLC context may indicate whether an acknowledged mode (e.g., a reordering timer is used) or an unacknowledged mode is used for the RLC sublayer 612. The MAC sublayer 610 provides multiplexing between logical and transport channels. The MAC sublayer 610 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 606 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 606 and L2 608 with the exception that there is no SDAP sublayer in the control plane and there is no header compression function for the control plane. The control plane also includes a radio resource control (RRC) sublayer 618 in L3 and a higher Non-Access Stratum (NAS) layer 620. The RRC sublayer 618 is responsible for establishing and configuring signaling radio bearers (SRBs) and data radio bearers (DRBs) between the base station and the UE, paging initiated by the 5GC or NG-RAN, and broadcast of system information related to Access Stratum (AS) and Non-Access Stratum (NAS). The RRC sublayer 618 is further responsible for QoS management, mobility management (e.g., handover, cell selection, inter-RAT mobility), UE measurement and reporting, and security functions. The NAS layer 620 is terminated at the AMF in the core network and performs various functions, such as authentication, registration management, and connection management.

In general, packets received by a sublayer from an upper sublayer may be referred to as Service Data Units (SDUs), while packets output from a sublayer to a lower sublayer may be referred to as Protocol Data Units (PDUs). For example, packets received by the PDCP sublayer 614 from an upper sublayer may be referred to as PDCP SDUs, and packets output from the PDCP sublayer 614 to the RLC sublayer 612 may be referred to as PDCP PDUs or RLC SDUs. As used herein, the terms PDCP PDU and RLC SDU may be used interchangeably.

Figure 7:
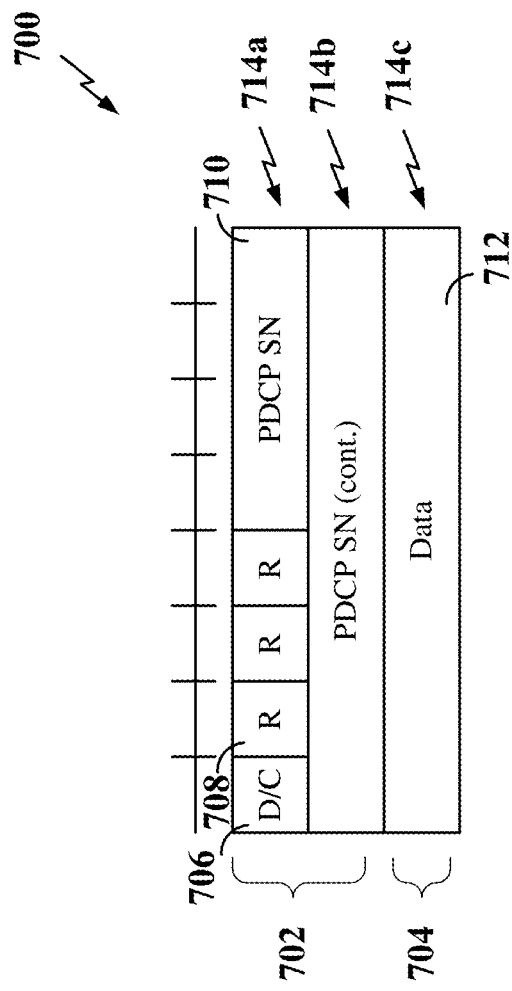
FIG. 7 is a diagram illustrating an example of a format of a Packet Data Convergence Protocol (PDCP) Packet Data Unit (PDU).

An example of a PDCP packet data unit (PDU) format is illustrated in FIG. 7. The PDCP PDU format 700 includes a header 702 and body 704. The header 702 includes a D/C field 706, three reserved fields 708, and a sequence number (SN) field 710. The D/C field 706 is located within a first octet 714a and may include, for example, a single bit for indicating whether the PCDP PDU contains user plane data or control plane data. In the example shown in FIG. 7, the SN field 710 occupies the remainder of the first octet 714a, along with a second octet 714b. The SN field 710 contains the sequence number (SN) of the PDCP PDU. In some examples, the SN may contain 7 bits or 12 bits. The body 704 contains uncompressed or compressed user or control plane data 712 and may include one or more octets (only one octet 714c of which is shown for simplicity).

Figure 8:
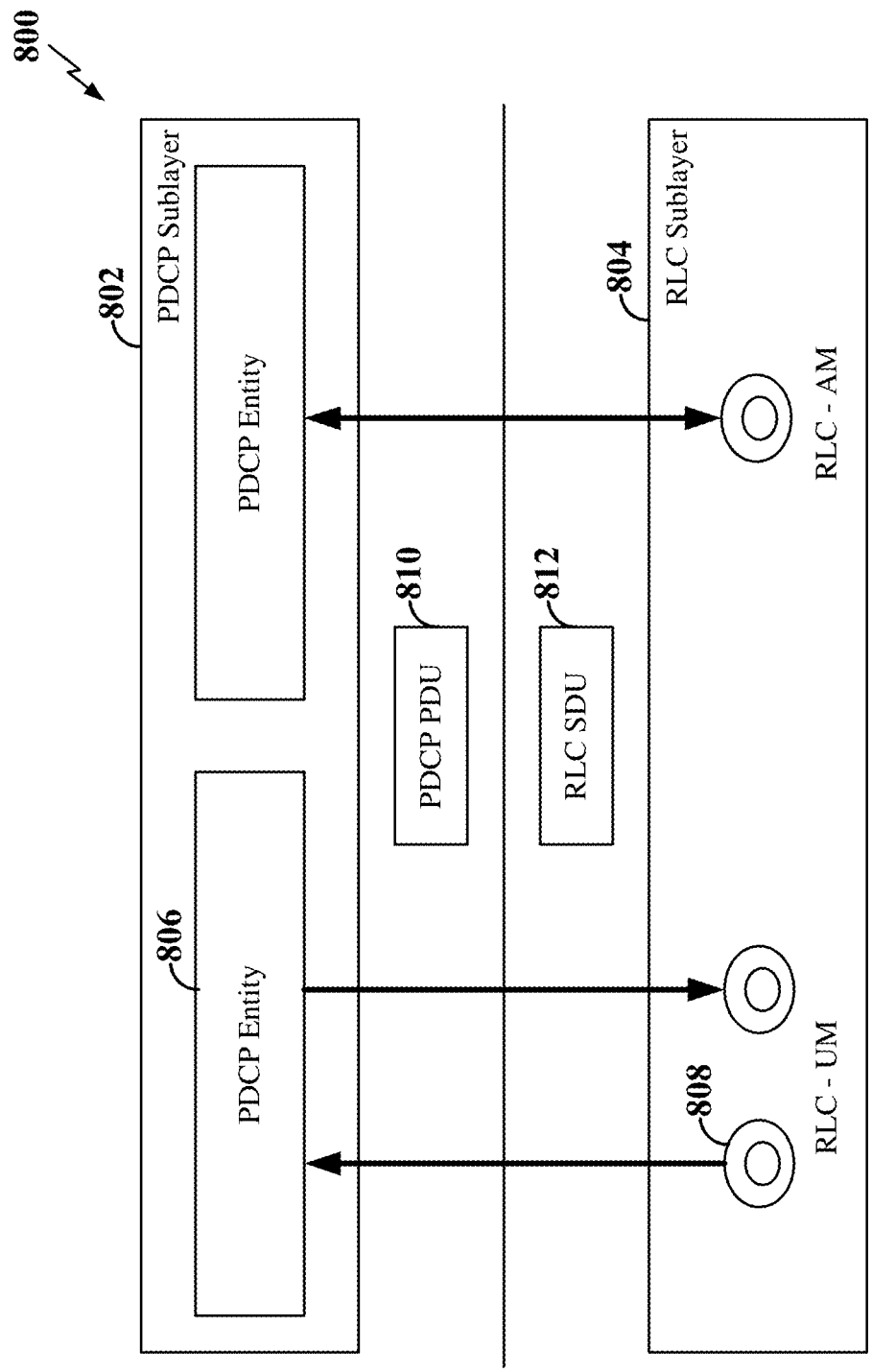
FIG. 8 is a diagram illustrating an example of a structure of a Packet Data Convergence Protocol (PDCP) sublayer and a radio link control (RLC) sublayer according to some aspects.

FIG. 8 is a diagram illustrating an example of a structure 800 of a Packet Data Convergence Protocol (PDCP) sublayer 802 and radio link control (RLC) sublayer 804 according to some aspects. The PDCP sublayer 802 includes one or more PDCP entities 806 defined for a device (e.g., a UE). In addition, the RLC sublayer 804 includes one or more RLC entities 808 defined for the UE. Each PDCP entity 806 carries data for one radio bearer (e.g., data radio bearer (DRB), sidelink radio bearer (SLRB), or signaling radio bearer (SRB)). A PDCP entity 806 is, therefore, associated to either the control plane or the user plane depending on which radio bearer it is carrying data for.

Each PDCP entity 806 is associated with one, two, or four (e.g., uni-directional/bi-directional or split/non-split) RLC entities 808 depending on the radio bearer characteristics (e.g., uni-directional or bi-directional) or the RLC mode. Here, the RLC mode may be either the transparent mode (TM), unacknowledged mode (UM mode) or acknowledged mode (AM). The TM is used for SRBO, paging, and broadcast of system information. The UM may be used, for example, to transmit delay sensitive packets, such as VoIP packets. In the UM, the receiving device does not acknowledge reception of data packets to the transmitting device (e.g., the receiving device does not transmit ACK/NACK to the transmitting device). The AM supports a HARQ/ARQ mechanism to retransmit lost PDUs.

For split bearers (e.g., in dual-connectivity (DC) mode) or for radio bearers configured with PDCP duplication, each PDCP entity 806 is associated with two bi-directional AM RLC entities 808. For LTE-WLAN (LWA) bearers, each PDCP entity 806 is associated with one (bi-directional) AM RLC entity 808 or two (uni-directional) UM RLC entities 808. For dual active protocol stack (DAPS) bearers, each PDCP entity is associated with two UM RLC entities 808 (for same direction, one for source and one for target cell), four uni-directional UM RLC entities 808 (two for each direction on source cell and target cell), or two bi-directional AM RLC entities (one for source cell and one for target cell). Otherwise, each PDCP entity 806 is associated with one bi-directional UM RLC entity 808, two uni-directional UM RLC entities 808, or one bi-directional AM RLC entity 808. In the example shown in FIG. 8, one of the PDCP entities 806 is associated with two uni-directional UM RLC entities 808, while the other PDCP entity 806 is associated with a bi-directional AM RLC entity 808.

The PDCP entities 806 and corresponding RLC entities 808 exchange PDCP PDUs 810, which may also be referred to as RLC SDUs 812. For example, a PDCP entity 806 may receive a PDCP PDU 810/RLC SDU 812 from a corresponding RLC entity 808. One of the functions provided by the PDCP sublayer 802 is deciphering of PDCP PDUs 810 received from the RLC sublayer 804. The ciphering and deciphering of packets are based on the packet COUNT value of the PDCP PDU 810. For example, a packet may be ciphered using a COUNT value generated by the transmitting side PDCP sublayer and deciphered using a COUNT value expected by a receiving side PDCP sublayer. Thus, in order to correctly decipher a packet at the receiver side, the transmitter and receiver must maintain an accurate record of the COUNT value associated with each packet.

In principle, the COUNT value is not reused during a session, and therefore the COUNT space is long, e.g., 32 bits. To reduce overhead, the transmitter and the receiver communicate the COUNT value of a packet by including only part of the COUNT value corresponding to the sequence number of a packet in the PDCP header. The sequence number (SN) has a smaller space, e.g. 7 bits or 12 bits. The transmitter and receiver also locally maintain a hyper frame number (HFN), which is incremented by 1 each time the SN wraps around. The COUNT value of a packet may thus be calculated by concatenating the locally maintained HFN with the SN received in the packet.

Thus, the PDCP PDU 810/RLC SDU 812 may include a PDCP sequence number (SN) 710, as shown in the example of FIG. 7. Based on the PDCP SN 710 of a received PDCP PDU 700, the PDCP entity 806 can calculate a received (RVCD) PDCP COUNT value (RCVD_COUNT) using the locally stored HFN. As a result, the RCVD_COUNT= [RCVD_HFN, RCVD_SN].

Upon reception of a PDCP PDU at a PDCP entity 806 from an RLC entity 808, the PDCP entity 806 can calculate the RCVD_COUNT as indicated in version 16 of 3GPP TS 38.323, Section 5.2.2.1, as follows (hereinafter referred to as an existing COUNT algorithm):
if RCVD_SN<SN (RX_DELIV)−Window_Size:
RCVD_HFN=HFN (RX_DELIV)+1.
else if RCVD_SN>=SN (RX_DELIV)+Window_Size:
RCVD_HFN=HFN (RX_DELIV)−1.
else:
RCVD_HFN=HFN (RX_DELIV);
RCVD_COUNT=[RCVD_HFN, RCVD_SN];
where RX_DELIV is the COUNT value of the first PDCP SDU not delivered to upper layers, but is still waited for, and the Window_Size is half of the SN space. For example, for a 12-bit PDCP SN, the window size is 2048.

The PDCP entity 806 can receive PDCP PDUs 810 from the RLC entity 808 with or without holes (e.g., missing PDCP PDUs within a range of PDCP PDUs). If the PDCP entity 806 receives a PDCP PDU 810 from the RLC entity 808 without holes (e.g., without one or more missing PDCP PDUs before it), the PDCP entity can deliver the corresponding PDCP SDU to the upper layer and update the RX_DELIV to an initial value (e.g., 0). However, if the PDCP entity 806 receives a PDCP PDU 810 with at least one missing PDCP PDU before it, the PDCP entity 806 may not deliver the corresponding PDCP SDU to the upper layer, but rather start a reordering timer and hold the received PDCP PDU until the missing PDCP PDU(s) are received or the reordering timer expires. For example, upon expiration of the reordering timer, the PDCP entity 806 can ignore missing PDCP PDUs and deliver the PDCP SDUs corresponding to the received PDCP PDUs during the reordering timer duration to the upper layer. Upon initiating the reordering timer, the PDCP entity 806 further updates the RX_DELIV to the COUNT value of the first missing PDCP PDU (e.g., the first PDCP SDU not delivered to upper layers).

In NR standalone mode, PDCP holes may arise when there is a missing RLC PDU. In dual connectivity (e.g., EN-DC or NR DC), there is a split radio bearer, and as such there are two RLC entities 808 associated with a single PDCP entity 806. In this case, in addition to missing RLC PDUs, PDCP holes may arrive when one RLC entity (e.g., an FR2 RLC entity) receives RLC PDUs faster than the other RLC entity (e.g., an FR1 or LTE RLC entity). Therefore, in DC, missing PDCP PDUs may be received by the PDCP entity 806 after the reordering timer expiration from the slower RLC entity 808. When this occurs, the PDCP entity 806 uses the HFN of the updated RX_DELIV to calculate the HFN of the received missing PDCP PDU, which may result in an HFN mismatch.

Figure 9:
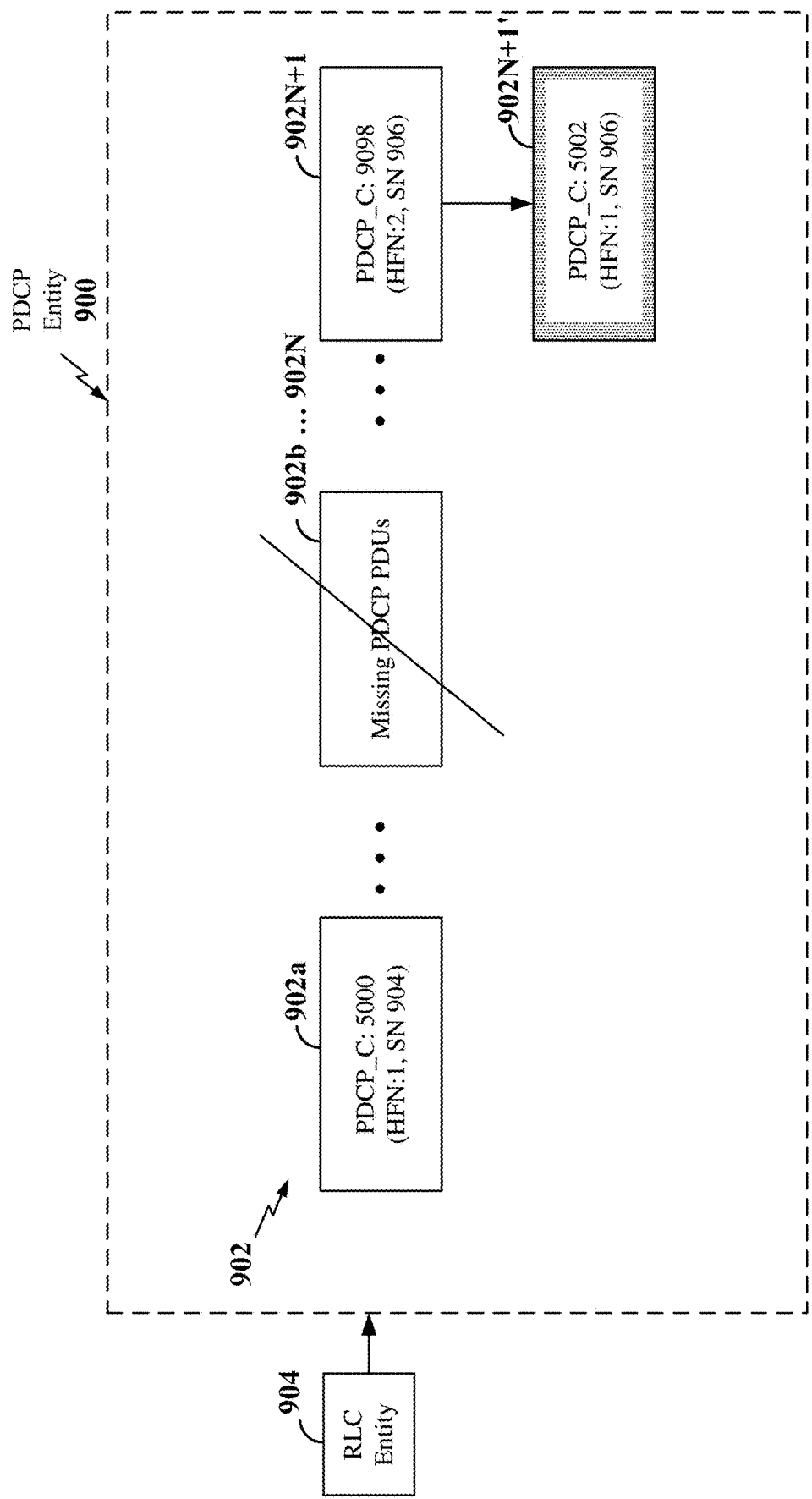
FIG. 9 is a diagram illustrating an example of a hyper frame number (HFN) mismatch in NR standalone mode according to some aspects.

FIG. 9 is a diagram illustrating an example of a hyper frame number (HFN) mismatch in NR standalone mode according to some aspects. In the example shown in FIG. 9, a plurality of PDCP PDUs 902 are delivered from an RLC entity 904 to a PDCP entity 900. For example, a first PDCP PDU 902a is shown successfully delivered to the PDCP entity 900 from the RLC entity 904. The PDCP entity 900 can then calculate a COUNT value (e.g., PDCP_C=5000) for the first PDCP PDU 902a using the correct HFN of HFN=1. The next PDCP PDU received by the PDCP entity 900 is PDCP PDU 902N+1, which is received with holes. Here, the holes include missing PDCP PDUs 902b . . . 902N. Therefore, the PDCP entity 900 sets RX_DELIV to the COUNT value of the first missing PDCP PDU (e.g., PDCP PDU 902b with a PDCP_C=5001).

Using the above existing COUNT algorithm for calculating the COUNT value of the current PDCP PDU 902N+1, the PDCP entity 900 calculates a COUNT value of 5002 (e.g., PDCP_C=5002). The PDCP entity 900 calculates the COUNT value of the current PDCP PDU 902N+1 by using the HFN of RX_DELIV (e.g., RCVD_HFN=HFN (RX_DELIV)), which is HFN=1. However, the HFN of the current PDCP PDU 902N+1 is actually HFN=2. As a result, this produces an HFN mismatch between the actual COUNT value (e.g., PDCP_C=9098) and the calculated COUNT value (e.g., PDCP_C=5002). The HFN mismatched PDCP PDU 902N+1' will fail deciphering in the PDCP entity, and therefore, will not be delivered to upper layers.

Various aspects of the disclosure provide for fast HFN resynchronization to overcome the HFN mismatch observed in NR standalone mode. Fast HFN resynchronization in NR standalone mode can be utilized to avoid HFN mismatch when a first gap (e.g., a COUNT value gap) between the COUNT value of the first missed PDCP PDU and the current delivered PDCP PDUs is greater than the PDCP Window_Size. In NR standalone mode, a second gap (e.g., an RLC sequence number (SN) gap) may be used to calculate the correct HFN when the first gap is greater than the PDCP Window_Size. By calculating the correct HFN for out-of-order PDCP PDUs, deciphering failure can be reduced, thus reducing the number of call drops.

Figure 10:
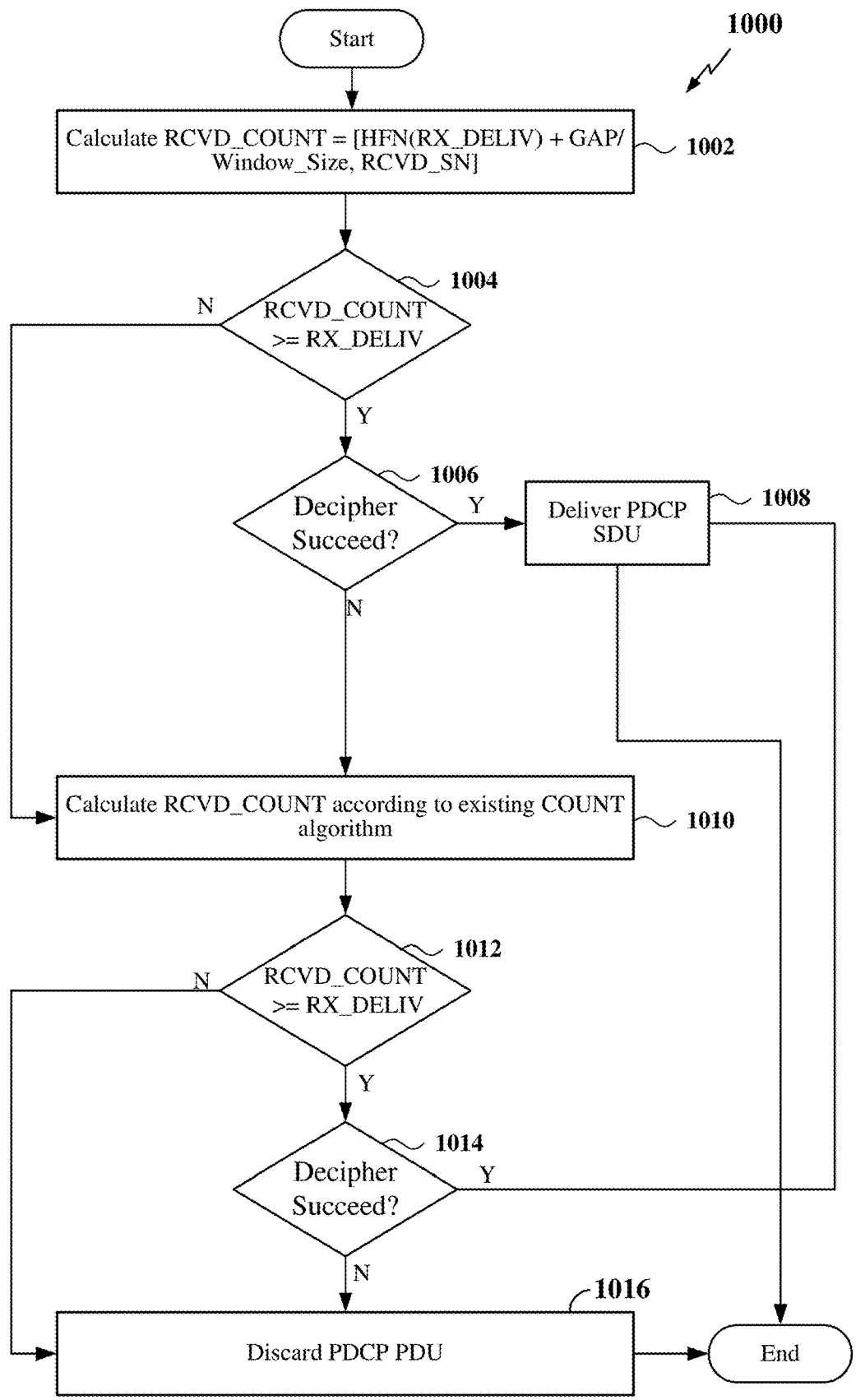
FIG. 10 is a flowchart illustrating an exemplary method for HFN resynchronization in NR standalone mode according to some aspects.

FIG. 10 is a flowchart illustrating an exemplary method 1000 for HFN resynchronization in NR standalone mode according to some aspects. As described below, some or all illustrated features may be omitted in a particular implementation within the scope of the present disclosure, and some illustrated features may not be required for implementation of all embodiments. In some examples, the method 1000 may be carried out by the wireless communication device 1700 illustrated in FIG. 17. In some examples, the method 1000 may be carried out by any suitable apparatus or means for carrying out the functions or algorithm described below.

At block 1002, the wireless communication device (e.g., a PDCP entity within the wireless communication device) may receive a current PDCP PDU from an RLC entity and calculate a COUNT value (RCVD_COUNT) of the current PDCP PDU based on a hyper frame number (HFN) of the first missing PDCP PDU after a successfully received PDCP PDU (HFN (RX_DELIV)), an RLC SN gap (GAP) between a RLC SN of the last (previously) received PDCP PDU and the RLC SN of the current PDCP PDU, and a PDCP window size (Window_Size). For example, the PDCP count of the current PDCP PDU may be calculated as RCVD_COUNT= [(HFN (RX_DELIV)+GAP/Window_Size), RCVD_SN]. In NR standalone mode, there may be a one-to-one mapping between the RLC sequence number (SN) and the PDCP count. For example, the RLC SN may have a different length than the PDCP SN. In an example, the network may configure a 12 bit PDCP SN and an 18 bit RLC SN for a radio bearer, where the 18 bit RLC SN wraps around, thus resulting in a 1-1 mapping with the PDCP COUNT. Using the example shown in FIG. 9, the PDCP count of the current PDCP PDU 902N+1 may be calculated as RCVD_COUNT=9098, with an HFN=1, GAP-4098, and RCVD_SN=906. This is the correct RCVD_COUNT for the PDCP PDU, as can be seen in FIG. 9, and as such the current PDCP PDU should pass deciphering.

At block 1004, the wireless communication device may determine whether the calculated PDCP count for the current PDCP PDU is greater than or equal to the PDCP count of the first missing PDCP PDU. For example, the wireless communication device may determine whether RCVD_COUNT>=RX_DELIV. If the RCVD_COUNT is greater than or equal to RX_DELIV (Y branch of block 1004), at block 1006, the wireless communication device may determine whether a deciphering operation on the PDCP PDU using the RCVD_COUNT succeeds. If deciphering succeeds (Y branch of block 1006), at block 1008, the wireless communication device may store the PDCP SDU in a reception buffer and deliver the PDCP SDU to upper layers.

If the RCVD_COUNT is less than RX_DELIV (N branch of block 1004) or if the deciphering operation fails (N branch of block 1006), at block 1010, the wireless communication device may calculate the PDCP count of the current PDCP PDU according to the existing COUNT algorithm above. At block 1012, the wireless communication device may determine whether the calculated PDCP count for the current PDCP PDU is greater than or equal to the PDCP count of the first missing PDCP PDU. For example, the wireless communication device may determine whether RCVD_COUNT>=RX_DELIV. If the RCVD_COUNT is greater than or equal to RX_DELIV (Y branch of block 1012), at block 1014, the wireless communication device may determine whether a deciphering operation on the PDCP PDU using the RCVD_COUNT succeeds. If deciphering succeeds (Y branch of block 1014), at block 1008, the wireless communication device may store the PDCP SDU in a reception buffer and deliver the PDCP SDU to upper layers.

If the RCVD_COUNT is less than RX_DELIV (N branch of block 1012) or if the deciphering operation fails (N branch of block 1014), at block 1016, the wireless communication device may discard the current PDCP PDU.

Figure 11:
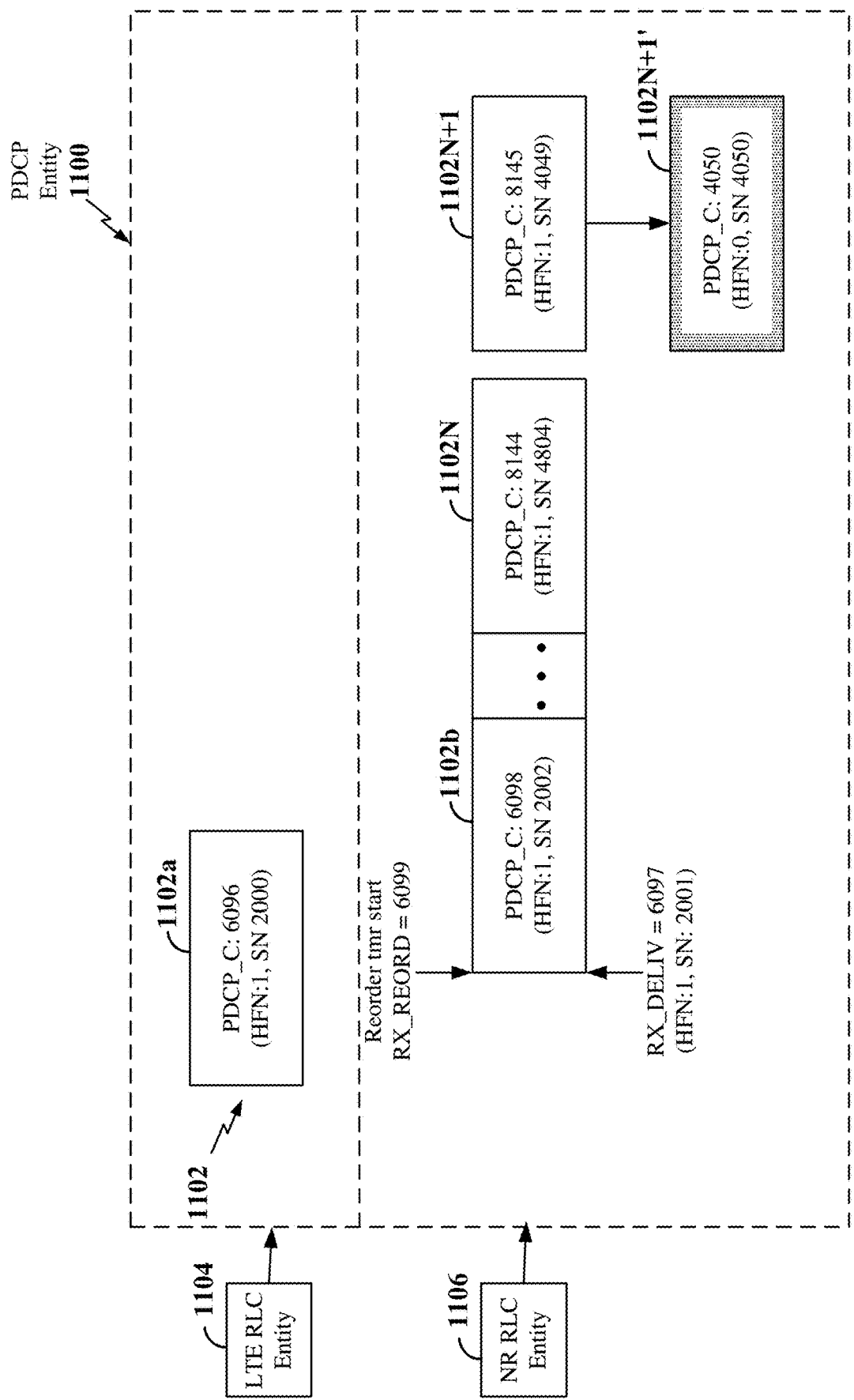
FIG. 11 is a diagram illustrating an example of a HFN mismatch in DC mode according to some aspects.

FIG. 11 is a diagram illustrating an example of a HFN mismatch in DC mode according to some aspects. As in the example shown in FIG. 9, a plurality of PDCP PDUs 1102 may be delivered to a PDCP entity 1100. In DC mode, the PDCP entity 1100 may receive PDCP PDUs from two different RLC entities 1104 and 1106. In the example shown in FIG. 11, a first RLC entity 1104 corresponds to a first radio access technology (RAT), such as LTE, and a second RLC entity 1106 corresponds to a second RAT, such as NR. In other examples, the RLC entities 1104 and 1106 may correspond to different frequency ranges (e.g., FR1 and FR2).

A first PDCP PDU 1102a is shown successfully delivered to the PDCP entity 1100 from the LTE RLC entity 1104. The PDCP entity 1100 can then calculate a COUNT value (e.g., PDCP_C=6096) for the first PDCP PDU 1102a using an HFN of 1 and SN of 2000. The next PDCP PDU received by the PDCP entity 1100 is PDCP PDU 1102b, which is received from the NR RLC entity 1106. However, there is a missing PDCP PDU between PDCP PDUs 1102a and 1102b. Therefore, the PDCP entity 1100 sets RX_DELIV to the COUNT value of the first missing PDCP PDU (e.g., RX_DELIV=6097, which has an HFN of 1 and a SN of 2001). In addition, the PDCP entity 1100 initializes a Reordering timer (t-Reordering) and sets a state variable RX_REORD to the COUNT value following the COUNT value associated with the PDCP PDU that triggered t-Reordering. Here, the PDCP entity 1100 sets RX_REORD to 6099, which is the COUNT value of the PDCP PDU following the PDCP PDU 1102b that triggered t-Reordering.

The PDCP entity continues to receive PDCP PDUs 1102b . . . 1102N from the NR RLC entity 1106 and calculates the COUNT value of each of the received PDCP PDUs 1102b . . . 1102N as 6098-8144. Since the PDCP PDU with a COUNT value of 6097 remains missing, RX_DELIV is not updated and is still set as RX_DELIV=6097. Once the PDCP entity 1100 receives PDCP PDU 1102N+1 from the NR RLC entity 1106, the PDCP entity 1100 calculates the COUNT value of PDCP PDU 1102N+1 using the existing COUNT algorithm above. For example, RCVD_SN (4049)>=SN (RX_DELIV) (2001)+Window_Size (2048). Thus, the PDCP entity 1100 assigns an HFN of 0 to PDCP PDU 1102N+1. However, the HFN of the current PDCP PDU 1102N+1 is actually HFN=1. As a result, this produces an HFN mismatch between the actual COUNT value (e.g., PDCP_C=8145) and the calculated COUNT value (e.g., PDCP_C=4050). The HFN mismatched PDCP PDU 1102N+1' will fail deciphering in the PDCP entity, and therefore, will not be delivered to upper layers.

Figure 12:
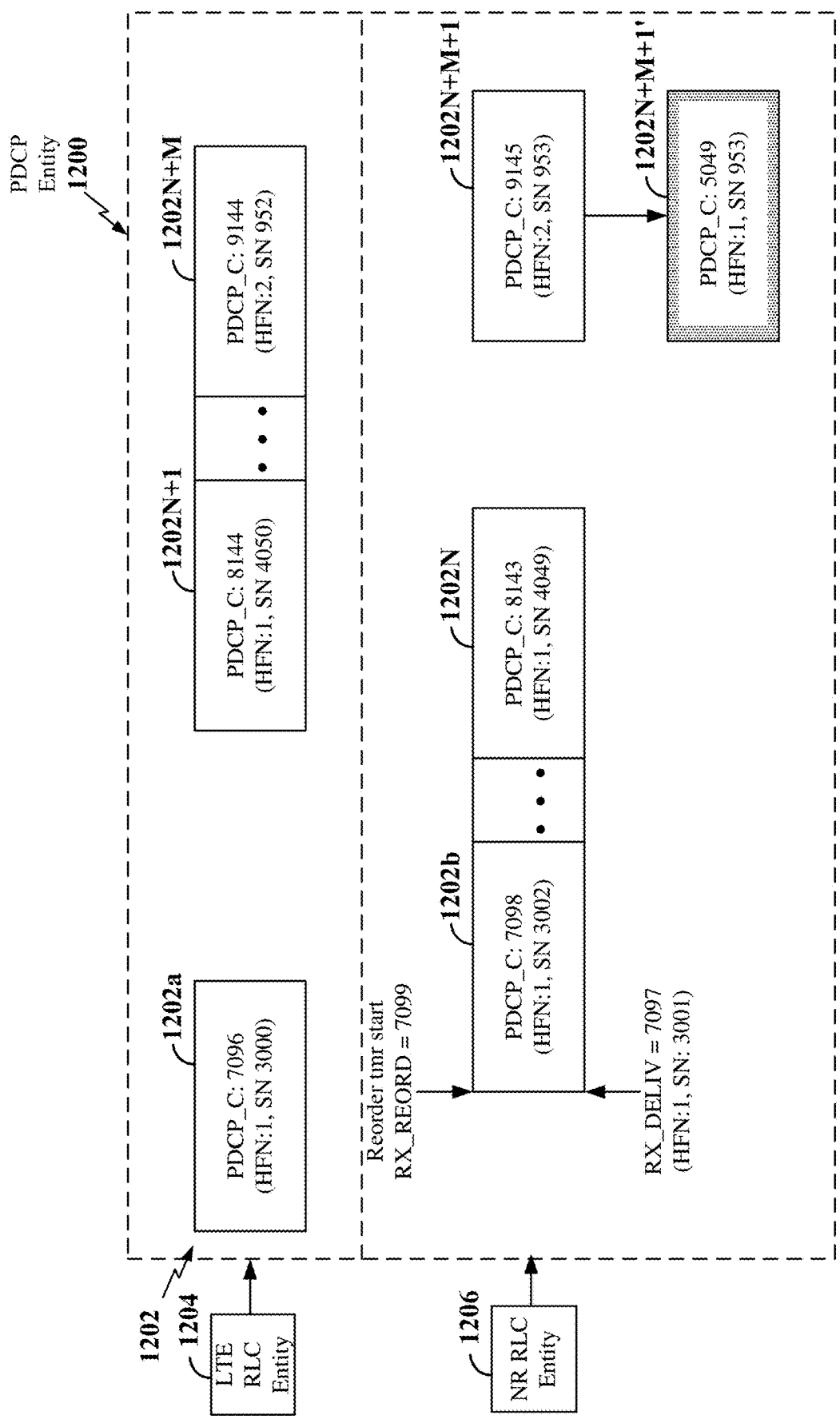
FIG. 12 is a diagram illustrating another example of a HFN mismatch in DC mode according to some aspects.

FIG. 12 is a diagram illustrating another example of a HFN mismatch in DC mode according to some aspects. As in the example shown in FIG. 11, a plurality of PDCP PDUs 1202 may be delivered to a PDCP entity 1200 from two different RLC entities 1204 and 1206. In the example shown in FIG. 12, a first RLC entity 1204 corresponds to a first radio access technology (RAT), such as LTE, and a second RLC entity 1206 corresponds to a second RAT, such as NR. In other examples, the RLC entities 1204 and 1206 may correspond to different frequency ranges (e.g., FR1 and FR2).

A first PDCP PDU 1202a is shown successfully delivered to the PDCP entity 1200 from the LTE RLC entity 1204. The PDCP entity 1200 can then calculate a COUNT value (e.g., PDCP_C=7096) for the first PDCP PDU 1202a using an HFN of 1 and SN of 3000. The next PDCP PDU received by the PDCP entity 1200 is PDCP PDU 1202b, which is received from the NR RLC entity 1206. However, there is a missing PDCP PDU between PDCP PDUs 1202a and 1202b. Therefore, the PDCP entity 1200 sets RX_DELIV to the COUNT value of the first missing PDCP PDU (e.g., RX_DELIV=7097, which has an HFN of 1 and a SN of 3001). In addition, the PDCP entity 1200 initializes a Reordering timer (t-Reordering) and sets RX_REORD to the COUNT value following the COUNT value associated with the PDCP PDU that triggered t-Reordering. Here, the PDCP entity 1200 sets RX_REORD to 7099, which is the COUNT value of the PDCP PDU following the PDCP PDU 1202b that triggered t-Reordering.

The PDCP entity 1200 continues to receive PDCP PDUs 1202b . . . 1202N from the NR RLC entity 1206 and calculates the COUNT value of each of the received PDCP PDUs 1202b . . . 1202N as 7098-8143. The PDCP entity 1200 then receives PDCP PDUs 1202N+1 . . . 120N+M from the LTE RLC entity 1204 and calculates the COUNT value of each of the received PDCP PDUs 1202N+1 . . . 1202N+M as 8144-9144. Since the PDCP PDU with a COUNT value of 7097 remains missing, RX_DELIV is not updated and is still set as RX_DELIV=7097. Once the PDCP entity 1200 receives PDCP PDU 1202N+M+1 from the NR RLC entity 1206, the PDCP entity 1200 calculates the COUNT value of PDCP PDU 1202N+M+1 using the existing COUNT algorithm above. For example, RCVD_SN (953)>=SN (RX_DELIV) (3001)−Window_Size (2048). Thus, the PDCP entity 1200 assigns an HFN of 1 to PDCP PDU 1202N+M+1. However, the HFN of the current PDCP PDU 1202N+M+1 is actually HFN=2. As a result, this produces an HFN mismatch between the actual COUNT value (e.g., PDCP_C=9145) and the calculated COUNT value (e.g., PDCP_C=5049). The HFN mismatched PDCP PDU 1202N+M+1' will fail deciphering in the PDCP entity, and therefore, will not be delivered to upper layers.

Figure 13:
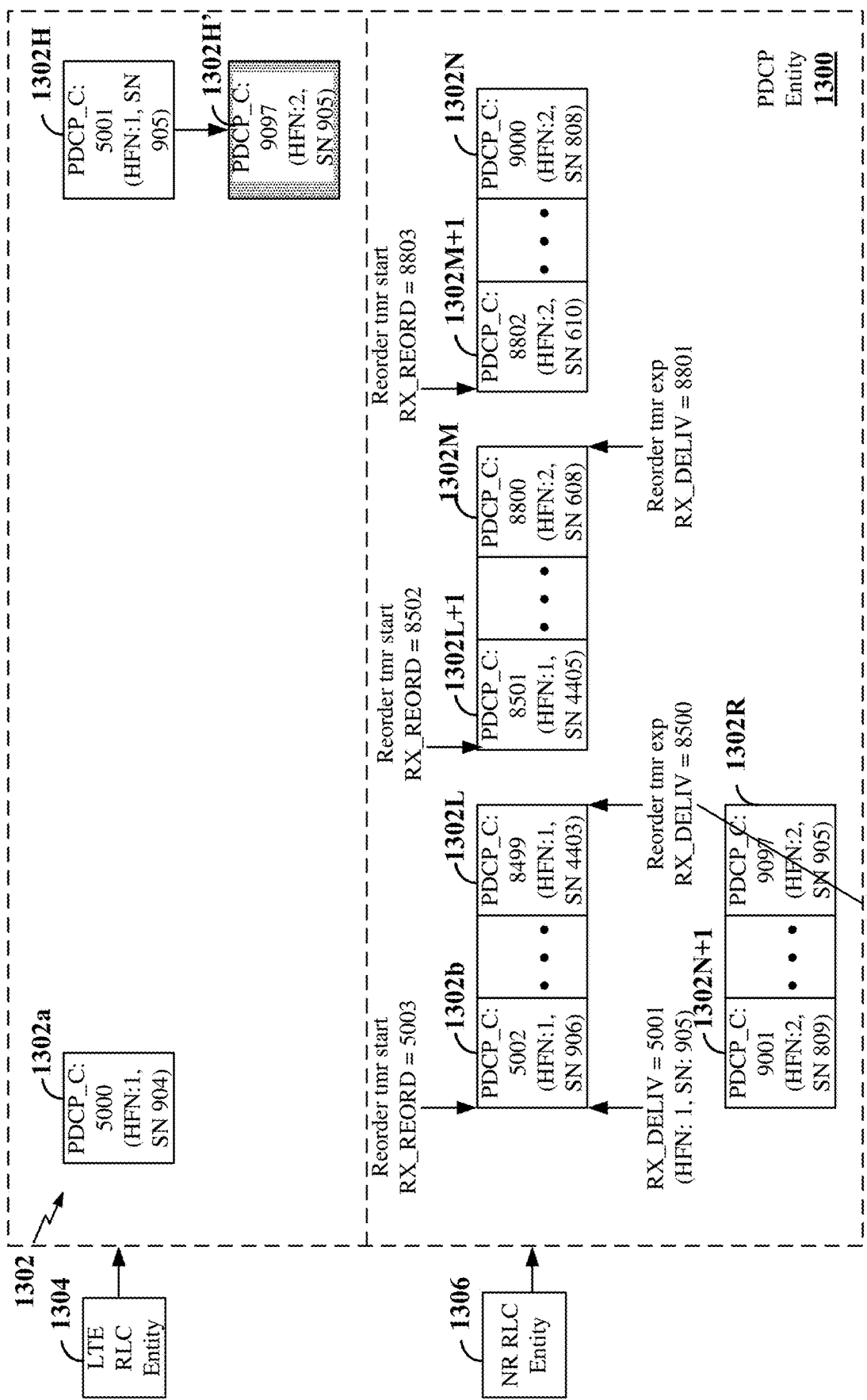
FIG. 13 is a diagram illustrating another example of a HFN mismatch in DC mode according to some aspects.

FIG. 13 is a diagram illustrating another example of a HFN mismatch in DC mode according to some aspects. As in the examples shown in FIGS. 11 and 12, a plurality of PDCP PDUs 1302 may be delivered to a PDCP entity 1300 from two different RLC entities 1304 and 1306. In the example shown in FIG. 13, a first RLC entity 1304 corresponds to a first radio access technology (RAT), such as LTE, and a second RLC entity 1306 corresponds to a second RAT, such as NR. In other examples, the RLC entities 1304 and 1306 may correspond to different frequency ranges (e.g., FR1 and FR2).

A first PDCP PDU 1302a is shown successfully delivered to the PDCP entity 1300 from the LTE RLC entity 1304. The PDCP entity 1300 can then calculate a COUNT value (e.g., PDCP_C=5000) for the first PDCP PDU 1302a using an HFN of 1 and SN of 904. The next PDCP PDU received by the PDCP entity 1300 is PDCP PDU 1302b, which is received from the NR RLC entity 1306. However, there is a missing PDCP PDU between PDCP PDUs 1302a and 1302b (first missing PDCP PDU 1302H). Therefore, the PDCP entity 1300 sets RX_DELIV to the COUNT value of the first missing PDCP PDU (e.g., RX_DELIV=5001, which has an HFN of 1 and a SN of 905). In addition, the PDCP entity 1300 initializes a Reordering timer (t-Reordering) and sets RX_REORD to the COUNT value following the COUNT value associated with the PDCP PDU that triggered t-Reordering. Here, the PDCP entity 1300 sets RX_REORD to 5004, which is the COUNT value of the PDCP PDU following the PDCP PDU 1302b that triggered t-Reordering.

The PDCP entity 1300 continues to receive PDCP PDUs 1302b . . . 1302L from the NR RLC entity 1306 and calculates the COUNT value of each of the received PDCP PDUs 1302b 1302L as 5002-8499. After reception of PDCP PDU 1302L, the reordering timer expires, and the PDCP entity 1300 delivers all PDCP PDUs before RX_REORD and consecutive PDCP PDUs received from RX_REORD to the PDCP PDU 1302M (e.g., PDCP PDUs 1302b . . . 1302L) to upper layers. The next PDCP PDU received the by PDCP entity 1300 is PDCP PDU 1302L+1, which is received from the NR RLC entity. However, there is a missing PDCP PDU between PDCP PDUs 1302L and 1302L+1.

The PDCP entity 1300 continues to receive PDCP PDUs 1302L+1 . . . . PDCP PDU 1302M and deliver the received PDCP PDUs 1302L+1 . . . . PDCP PDU 1302M to upper layers. Therefore, the PDCP entity 1300 sets RX_DELIV to the COUNT value of the first missing PDCP PDU (e.g., RX_DELIV=8500, which has an HFN of 1 and a SN of 4404). In addition, the PDCP entity 1300 initializes a Reordering timer (t-Reordering) and sets RX_REORD to the COUNT value following the COUNT value associated with the PDCP PDU that triggered t-Reordering. Here, the PDCP entity 1300 sets RX_REORD to 8502, which is the COUNT value of the PDCP PDU following the PDCP PDU 1302L+1 that triggered t-Reordering.

The PDCP entity 1300 continues to receive PDCP PDUs 1302L+1 . . . 1302M from the NR RLC entity 1306 and calculates the COUNT value of each of the received PDCP PDUs 1302L+1 . . . 1302M as 8501-8800. After reception of PDCP PDU 1302M, the reordering timer expires, and the PDCP entity 1300 delivers all PDCP PDUs before RX_REORD and consecutive PDCP PDUs received from RX_REORD to the PDCP PDU 1302M (e.g., PDCP PDUs 1302L+1 . . . 1302M) to upper layers. The next PDCP PDU received the by PDCP entity 1300 is PDCP PDU 1302M+1, which is received from the NR RLC entity. However, there is a missing PDCP PDU between PDCP PDUs 1302M and 1302M+1.

Therefore, the PDCP entity 1300 sets RX_DELIV to the COUNT value of the first missing PDCP PDU (e.g., RX_DELIV=8801, which has an HFN of 2 and a SN of 609). In addition, the PDCP entity 1300 initializes a Reordering timer (t-Reordering) and sets RX_REORD to the COUNT value following the COUNT value associated with the PDCP PDU that triggered t-Reordering. Here, the PDCP entity 1300 sets RX_REORD to 8803, which is the COUNT value of the PDCP PDU following the PDCP PDU 1302M+1 that triggered t-Reordering.

The PDCP entity 1300 then receives PDCP PDUs 1302M+1 . . . 1302N from the NR RLC entity 1306 and calculates the COUNT value of each of the received PDCP PDUs 1302M+1 . . . 1302N as 8802-9000. Since the PDCP PDU with a COUNT value of 8801 remains missing, RX_DELIV is not updated and is still set as RX_DELIV=8801. The PDCP entity 1300 then receives the first missing PDCP PDU 1302H (HFN:1, SN: 905) from the LTE RLC entity 1304. The PDCP entity 1300 then calculates the COUNT value of PDCP PDU 1302H using the existing COUNT algorithm above. For example, RCVD_HFN=HFN (RX_DELIV) (2). Thus, the PDCP entity 1300 assigns an HFN of 2 to PDCP PDU 1302H. However, the HFN of the current PDCP PDU 1302H is actually HFN=1. As a result, this produces an HFN mismatch between the actual COUNT value (e.g., PDCP_C=5001) and the calculated COUNT value (e.g., PDCP_C=9097). The HFN mismatched PDCP PDU 1302H' will fail deciphering in the PDCP entity, and therefore, will not be delivered to upper layers.

In addition, the PDCP entity 1300 further receives PDCP PDUs 1302N+1 . . . 1302R and calculates the COUNT value of each of the received PDCP PDUs 1302N+1 . . . 1302R as 9001-9097. However, the COUNT value of 9097 has already been received by the PDCP entity 1300 as PDCP PDU 1302H', and therefore, PDCP PDU 1302R will be discarded by the PDCP entity 1300.

Various aspects of the disclosure further provide for fast HFN resynchronization to overcome the HFN mismatch observed in DC mode. Fast HFN resynchronization in DC mode can be utilized to avoid HFN mismatch when the gap between the COUNT value of the first missed PDCP PDU and the current delivered PDCP PDUs is greater than the PDCP Window_Size. By calculating the correct HFN for out-of-order PDCP PDUs, deciphering failure and PDCP PDU discards can be reduced, thus reducing the number of call drops.

Figure 14:
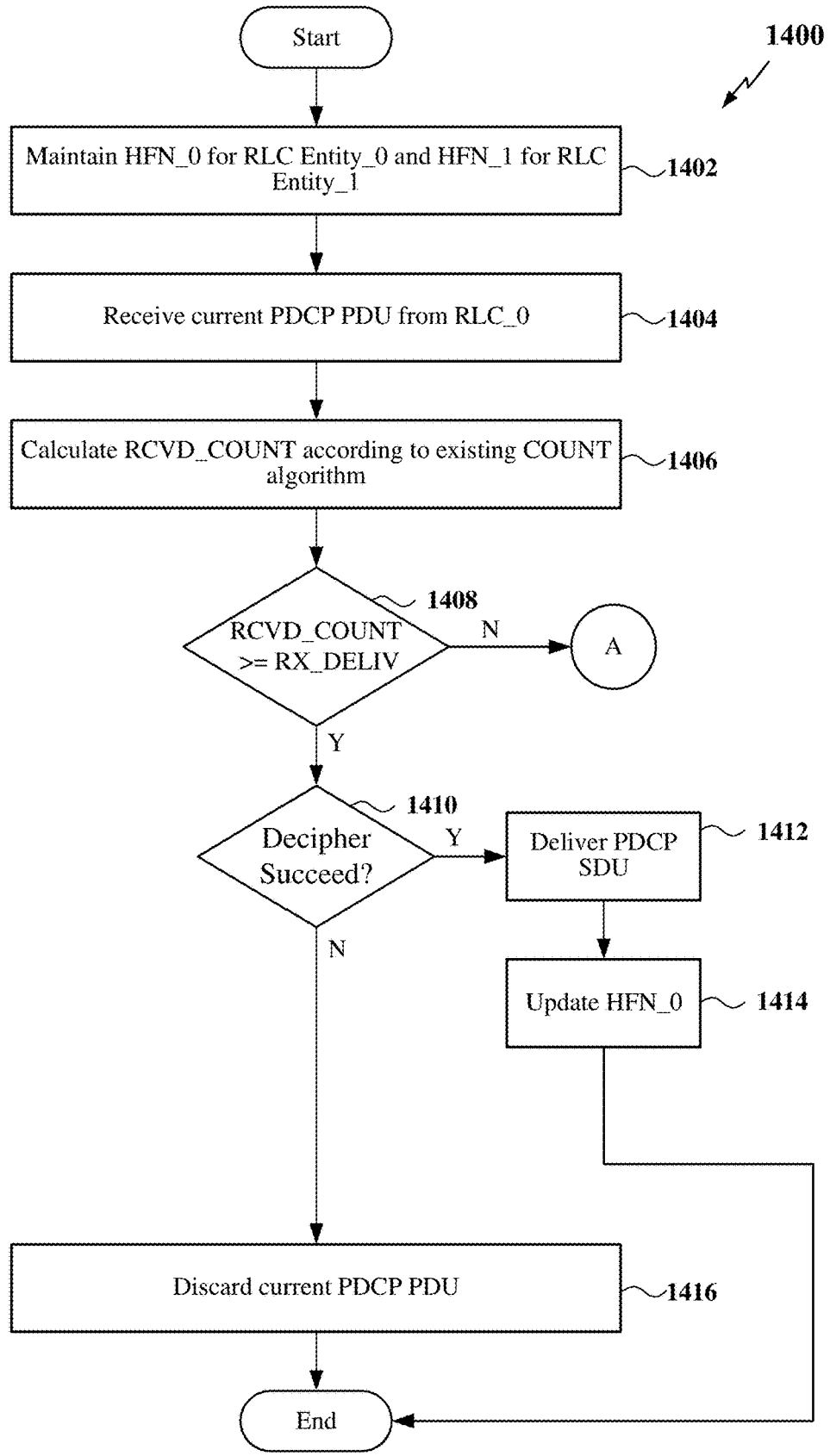
FIGS. 14-16 are flowcharts illustrating an exemplary method for HFN resynchronization in DC mode according to some aspects.
Figure 15:
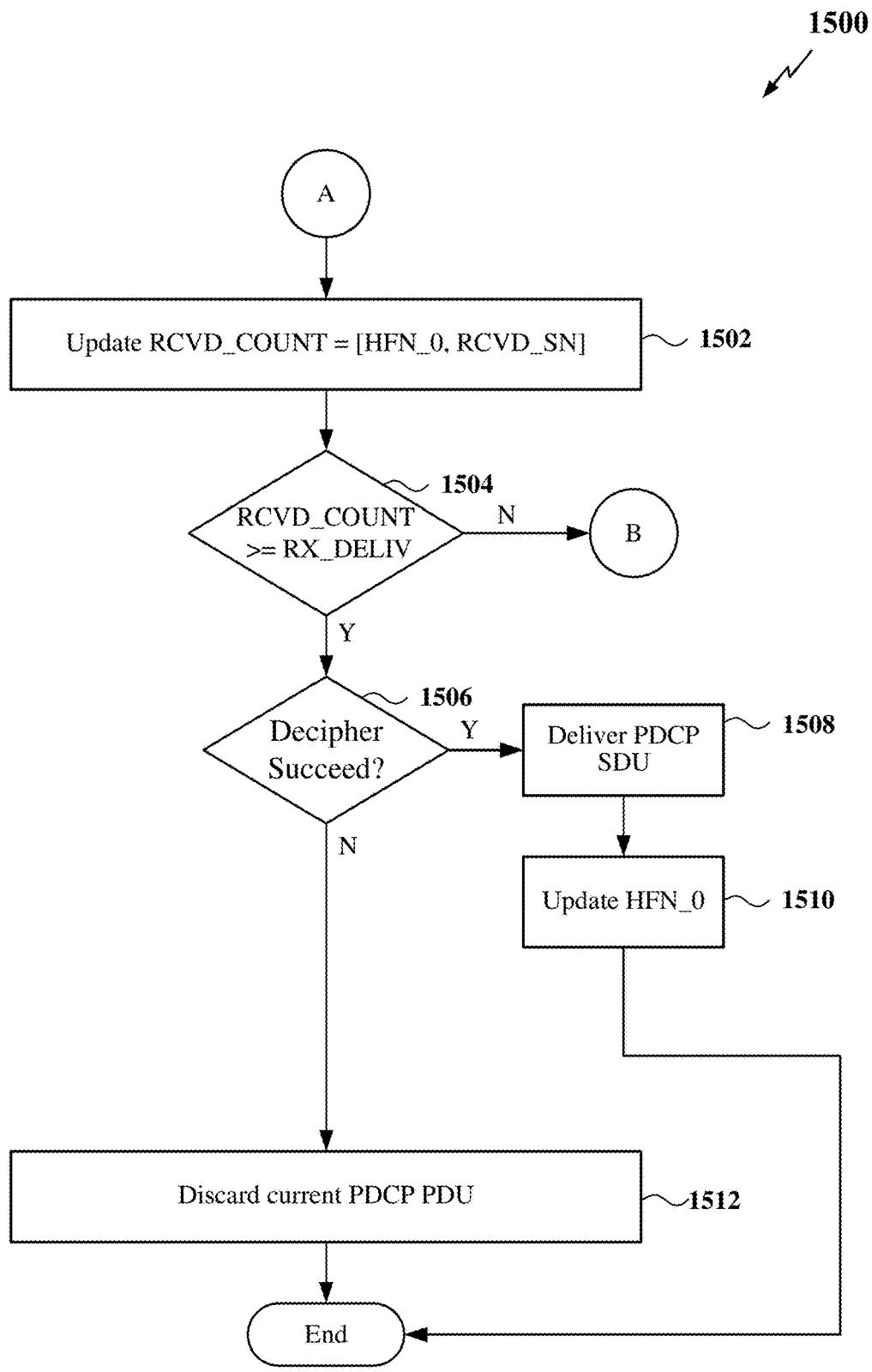
Figure 16:
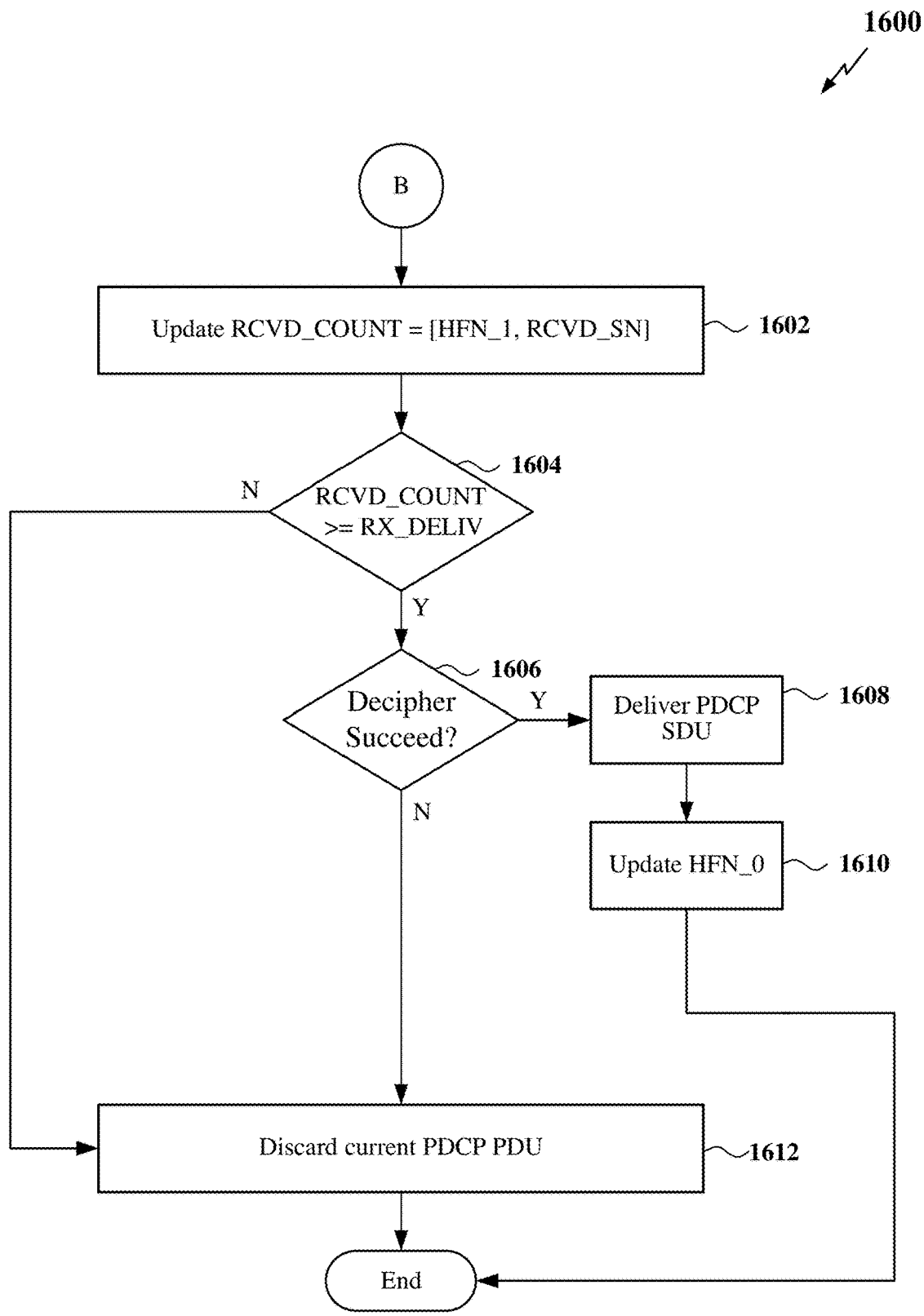

FIGS. 14-16 are flowcharts illustrating an exemplary method 1400-1600 for HFN resynchronization in DC mode according to some aspects. As described below, some or all illustrated features may be omitted in a particular implementation within the scope of the present disclosure, and some illustrated features may not be required for implementation of all embodiments. In some examples, the method 1400-1600 may be carried out by the wireless communication device 1700 illustrated in FIG. 17. In some examples, the method 1400-1600 may be carried out by any suitable apparatus or means for carrying out the functions or algorithm described below.

At block 1402, the wireless communication device (e.g., a PDCP entity within the wireless communication device) may maintain a first HFN (e.g., HFN_0) associated with a first RLC entity (e.g., RLC_0) and a second HFN (e.g., HFN_1) associated with a second RLC entity (e.g., RLC_1). In some examples, the first RLC entity (RLC_0) may be associated with a first radio access technology (RAT) and the second RLC entity (RLC_0) may be associated with a second RAT while operating in DC mode. In some example examples, the first RAT may be LTE and the second RAT may be NR. In other examples, each RLC entity may be associated with a different frequency range (e.g., FR1, FR2, etc.).

At block 1404, the wireless communication device may receive a current PDCP PDU from the first RLC entity (RLC_0). The wireless communication device may be configured to receive a plurality of PDCP PDUs including a first subset of PDCP PDUs associated with RLC_0 and a second subset of PDCP PDUs associated with RLC_1. The current PDCP PDU may be within the first subset of PDCP PDUs.

At block 1406, the wireless communication device may calculate a COUNT value (RCVD_COUNT) of the current PDCP PDU using the existing COUNT algorithm described above. Using the example shown in FIG. 13, where the current PDCP PDU is PDCP PDU 1302H, the wireless communication device can calculate the RCVD_COUNT of PDCP PDU 1302H as PDCP_C=9097 by assigning an HFN of 2 to PDCP PDU 1302H using the existing COUNT algorithm.

At block 1408, the wireless communication device may determine whether the COUNT value (RCVD_COUNT) of the current PDCP PDU is greater than or equal to RX_DELIV. If the COUNT value of the current PDCP PDU is greater than or equal to RX_DELIV (Y branch of block 1408), at block 1410, the wireless communication device performs a deciphering operation on the current PDCP PDU using the RCVD_COUNT and determines whether deciphering of the current PDCP PDU succeeds.

If the deciphering operation is successful (Y branch of block 1410), at block 1412, the wireless communication device may store the PDCP SDU in reception buffers and deliver the PDCP SDU to upper layers. At block 1414, the wireless communication device may then update the HFN_0 to the HFN of the current PDCP PDU (e.g., HFN_0=HFN (RCVD_COUNT)).

However, if the deciphering operation is unsuccessful (N branch of block 1410), at block 1416, the wireless communication device may discard the current PDCP PDU. Again, using the example shown in FIG. 13, the COUNT value of the current PDCP PDU 1302H (RCVD_COUNT=9097) is greater than the stored RX_DELIV of 8801, and therefore, the wireless communication device may perform a deciphering operation on the current PDCP PDU 1302H at block 1410. However, since the COUNT value of the current PDCP PDU 1302H is incorrect, deciphering will fail (N branch of block 1410), and the wireless communication device may discard the current PDCP PDU 1302H at block 1416. By discarding the current PDCP PDU 1302H, the wireless communication device may later correctly receive and decipher the PDCP PDU 1302R, thus preventing this PDCP PDU 1302R from being discarded.

If the RCVD_COUNT is less than RX_DELIV (N branch of block 1408), the method proceeds to block 1502 of FIG. 15, where the wireless communication device updates the calculated RCVD_COUNT of the current PDCP PDU with the locally stored and maintained HFN of the RLC_0 (as indicated in block 1402). For example, the wireless communication device may update the RCVD_COUNT based on HFN_0 and the PDCP sequence number (SN) of the PDCP PDU as follows: RCVD_COUNT=[HFN_0, RCVD_SN].

At block 1504, the wireless communication device may determine whether the COUNT value (RCVD_COUNT) of the current PDCP PDU is greater than or equal to RX_DELIV. If the COUNT value of the current PDCP PDU is greater than or equal to RX_DELIV (Y branch of block 1504), at block 1506, the wireless communication device performs a deciphering operation on the current PDCP PDU using the RCVD_COUNT and determines whether deciphering of the current PDCP PDU succeeds.

If the deciphering operation is successful (Y branch of block 1506), at block 1508, the wireless communication device may store the PDCP SDU in reception buffers and deliver the PDCP SDU to upper layers. At block 1510, the wireless communication device may then update the HFN_0 to the HFN of the current PDCP PDU (e.g., HFN_0=HFN (RCVD_COUNT)). However, if the deciphering operation is unsuccessful (N branch of block 1506), at block 1512, the wireless communication device may discard the current PDCP PDU.

Using the example shown in FIG. 11, where the current PDCP PDU is PDCP PDU 1102N+1 and HFN_0 corresponds to the NR RAT, at block 1406 shown in FIG. 14, the wireless communication device can calculate the RCVD_COUNT of PDCP PDU 1102N+1 as PDCP_C=4050 by assigning an HFN of 0 to PDCP PDU 1102N+1 using the existing COUNT algorithm. At block 1408, the wireless communication device determines that the RCVD_COUNT (4050) is less than RX_DELIV (6097), and as such proceeds to block 1502 to update the HFN of PDCP PDU 1102N+1 to the locally maintained HFN of HFN_0 (NR RLC entity). In the example shown in FIG. 11, the locally maintained HFN of HFN_0 is HFN=1, as the last successfully received PDCP PDU 1102N from the NR RLC entity had an HFN of 1. Using an HFN of 1, the wireless communication device can update the RCVD_COUNT of PDCP PDU 1102N+1 to 8145. At block 1504, the wireless communication device can then determine that the RCVD_COUNT (8145) is greater than or equal to RX_DELIV (6097) and proceed to decipher the PDCP PDU 1102N+1 at block 1506. The PDCP PDU 1102N+1 with a RCVD_COUNT of 8145 may then be successfully deciphered and delivered to upper layers. The wireless communication device may further update the HFN_0 to the HFN of PDCP PDU 1102N+1 (e.g., HFN_0=1).

If the RCVD_COUNT is less than RX_DELIV (N branch of block 1504), the method proceeds to block 1602 of FIG. 16, where the wireless communication device updates the calculated RCVD_COUNT of the current PDCP PDU with the locally stored and maintained HFN of the RLC_1 (as indicated in block 1402). For example, the wireless communication device may update the RCVD_COUNT based on HFN_1 and the PDCP sequence number (SN) of the PDCP PDU as follows: RCVD_COUNT=[HFN_1, RCVD_SN].

At block 1604, the wireless communication device may determine whether the COUNT value (RCVD_COUNT) of the current PDCP PDU is greater than or equal to RX_DELIV. If the COUNT value of the current PDCP PDU is greater than or equal to RX_DELIV (Y branch of block 1604), at block 1606, the wireless communication device performs a deciphering operation on the current PDCP PDU using the RCVD_COUNT and determines whether deciphering of the current PDCP PDU succeeds.

If the deciphering operation is successful (Y branch of block 1606), at block 1608, the wireless communication device may store the PDCP SDU in reception buffers and deliver the PDCP SDU to upper layers. At block 1610, the wireless communication device may then update the HFN_0 to the HFN of the current PDCP PDU (e.g., HFN_0=HFN (RCVD_COUNT)). However, if the deciphering operation is unsuccessful (N branch of block 1606), at block 1612, the wireless communication device may discard the current PDCP PDU.

Using the example shown in FIG. 12, where the current PDCP PDU is PDCP PDU 1202N+M+1 and HFN_0 corresponds to the NR RAT, at block 1406 shown in FIG. 14, the wireless communication device can calculate the RCVD_COUNT of PDCP PDU 1202N+M+1 as PDCP_C=5049 by assigning an HFN of 1 to PDCP PDU 1202N+M+1 using the existing COUNT algorithm. At block 1408, the wireless communication device determines that the RCVD_COUNT (5049) is less than RX_DELIV (7097), and as such proceeds to block 1502 to update the HFN of PDCP PDU 1202N+M+1 to the locally maintained HFN of HFN_0 (NR RLC entity). In the example shown in FIG. 12, the locally maintained HFN of HFN_0 is HFN=1, as the last successfully received PDCP PDU 1202N from the NR RLC entity had an HFN of 1. Using an HFN of 1, the wireless communication device calculates the same the RCVD_COUNT of PDCP PDU 1202N+M+1 (e.g., PDCP_C: 5049). Therefore, at block 1504, the wireless communication device again determines that the RCVD_COUNT (5049) is less than RX_DELIV (7097).

As such, the wireless communication device proceeds to block 1602 of FIG. 16, where the wireless communication device updates the HFN of PDCP PDU 1202N+M+1 to the locally maintained HFN of HFN_1 (LTE RLC entity). In the example shown in FIG. 12, the locally maintained HFN of HFN_1 is HFN=2, since the last successfully received PDCP PDU 120N+M from the LTE RLC entity had an HFN of 2. Using an HFN of 2, the wireless communication device can update the RCVD_COUNT of PDCP PDU 1202N+M+1 to 9145. At block 1604, the wireless communication device can then determine that the RCVD_COUNT (9145) is greater than or equal to RX_DELIV (7097) and proceed to decipher the PDCP PDU 1202N+M+1 at block 1606. The PDCP PDU 1202N+M+1 with a RCVD_COUNT of 9145 may then be successfully deciphered and delivered to upper layers. The wireless communication device may further update the HFN_0 to the HFN of PDCP PDU 1202N+M+1 (e.g., HFN_0=2).

Figure 17:
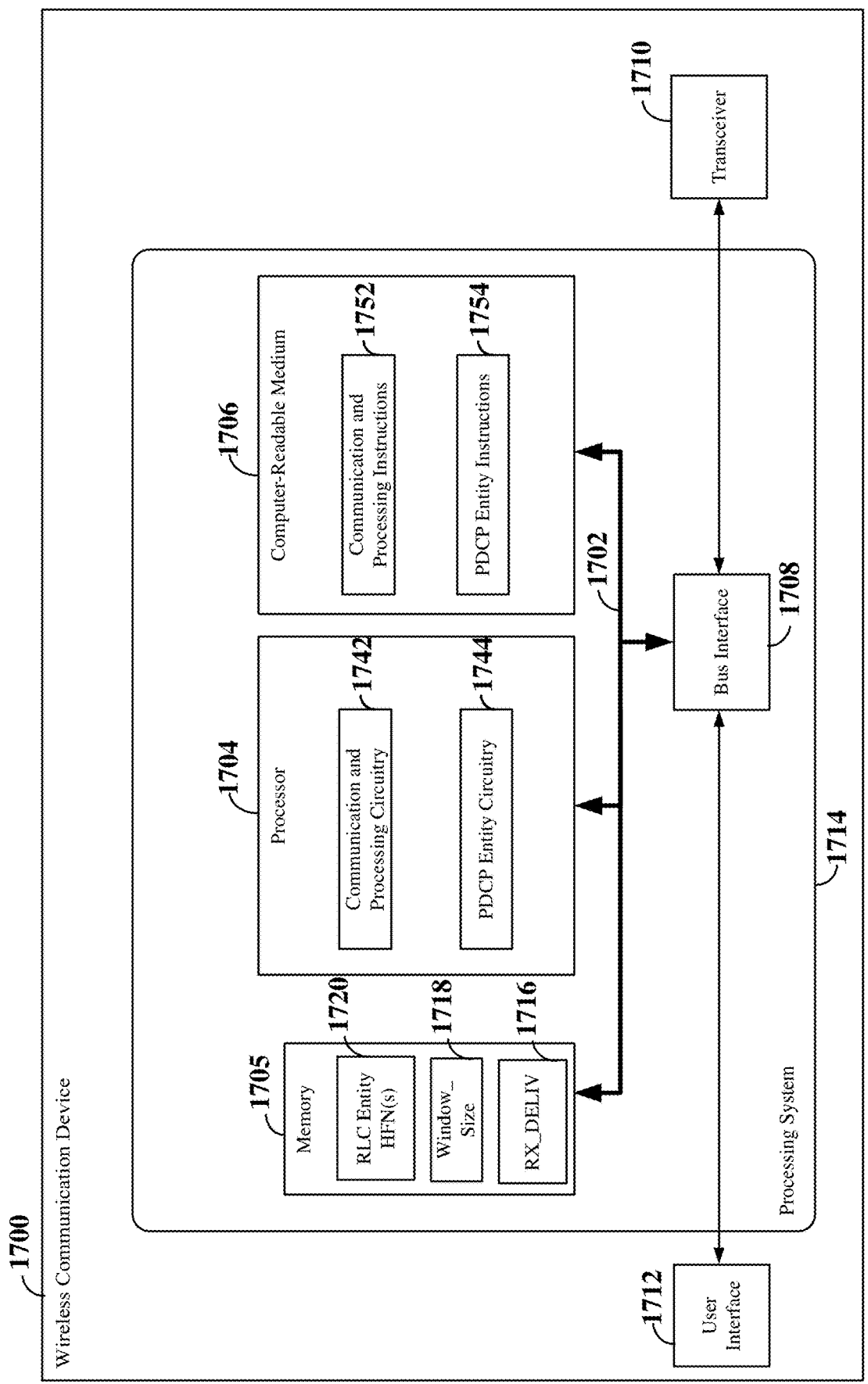
FIG. 17 is a block diagram illustrating an example of a hardware implementation for a wireless communication device employing a processing system according to some aspects.

FIG. 17 is a block diagram illustrating an example of a hardware implementation of a user equipment (UE) 1700 employing a processing system 1714 according to some aspects. The wireless communication device 1700 may be any of the UEs or other scheduled entities illustrated in any one or more of FIGS. 1, 2, 4, and/or 5.

In accordance with various aspects of the disclosure, an element, or any portion of an element, or any combination of elements may be implemented with a processing system 1714 that includes one or more processors, such as processor 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1700 may be configured to perform any one or more of the functions described herein. That is, the processor 1704, as utilized in the wireless communication device 1700, may be used to implement any one or more of the methods or processes described and illustrated, for example, in FIGS. 14-16, and/or 19.

The processor 1704 may in some instances be implemented via a baseband or modem chip and in other implementations, the processor 1704 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits, including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, are not described any further.

A bus interface 1708 provides an interface between the bus 1702 and a transceiver 1710. The transceiver 1710 may be, for example, a wireless transceiver. The transceiver 1710 provides a means for communicating with various other apparatus over a transmission medium (e.g., air interface). The transceiver 1710 may further be coupled to one or more antennas/antenna arrays (not shown). The bus interface 1708 further provides an interface between the bus 1702 and a user interface 1712 (e.g., keypad, display, touch screen, speaker, microphone, control features, etc.). Of course, such a user interface 1712 may be omitted in some examples.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. In some examples, the computer-readable medium 1706 may be part of the memory 1705. Those skilled in the art will recognize how best to implement the described functionality presented throughout this disclosure depending on the particular application and the overall design constraints imposed on the overall system. In some examples, the computer-readable medium 1706 may be implemented on an article of manufacture, which may further include one or more other elements or circuits, such as the processor 1704 and/or memory 1705.

The computer-readable medium 1706 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1704, may be responsible for managing the bus 1702 and general processing, including the execution of the software (e.g., instructions or computer-executable code) stored on the computer-readable medium 1706. The software, when executed by the processor 1704, causes the processing system 1714 to perform the various processes and functions described herein for any particular apparatus. The computer-readable medium 1706 and/or the memory 1705 may also be used for storing data that may be manipulated by the processor 1704 when executing software. For example, the memory 1705 may store one or more of RX_DELIV 1716, Window_Size 1718, and RLC entity HFN(s) 1720.

In some aspects of the disclosure, the processor 1704 may include circuitry configured for various functions. For example, the processor 1704 may include communication and processing circuitry 1742 configured to communicate with a base station (e.g., a gNB or eNB). In some examples, the communication and processing circuitry 1742 may be configured to communicate with the base station via two or more TRPs (e.g., in a DC mode). In some examples, the communication and processing circuitry 1742 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1742 may include one or more transmit/receive chains. The communication and processing circuitry 1742 may further be configured to execute communication and processing software 1752 stored on the computer-readable medium 1706 to implement one or more functions described herein.

In some implementations where the communication involves receiving information, the communication and processing circuitry 1742 may obtain information from a component of the wireless communication device 1700 (e.g., from the transceiver 1710 that receives the information via radio frequency signaling or some other type of signaling suitable for the applicable communication medium), process (e.g., decode) the information, and output the processed information. For example, the communication and processing circuitry 1742 may output the information to another component of the processor 1704, to the memory 1705, or to the bus interface 1708. In some examples, the communication and processing circuitry 1742 may receive one or more of signals, messages, other information, or any combination thereof. In some examples, the communication and processing circuitry 1742 may receive information via one or more channels. In some examples, the communication and processing circuitry 1742 may include functionality for a means for receiving. In some examples, the communication and processing circuitry 1742 may include functionality for a means for processing, including a means for demodulating, a means for decoding, etc.

In some implementations where the communication involves sending (e.g., transmitting) information, the communication and processing circuitry 1742 may obtain information (e.g., from another component of the processor 1704, the memory 1705, or the bus interface 1708), process (e.g., modulate, encode, etc.) the information, and output the processed information. For example, the communication and processing circuitry 1742 may output the information to the transceiver 1710 (e.g., that transmits the information via radio frequency signaling or some other type of signaling suitable for the applicable communication medium). In some examples, the communication and processing circuitry 1742 may send one or more of signals, messages, other information, or any combination thereof. In some examples, the communication and processing circuitry 1742 may send information via one or more channels. In some examples, the communication and processing circuitry 1742 may include functionality for a means for sending (e.g., a means for transmitting). In some examples, the communication and processing circuitry 1742 may include functionality for a means for generating, including a means for modulating, a means for encoding, etc.

The processor 1704 may further include PDCP entity circuitry 1744, configured to receive a plurality of PDCP PDUs from one or more RLC entities within an RLC sublayer of the wireless communication device 1700 and process the PDCP PDUs for transmission to upper layers. The PDCP entity circuitry 1744 may correspond, for example, to the PDCP entity 900 shown in FIG. 9, the PDCP entity 1100 shown in FIG. 11, the PDCP entity 1200 shown in FIG. 12, and/or the PDCP entity 1300 shown in FIG. 13. The PDCP entity circuitry 1744 may be associated, for example, with a single radio bearer (e.g., SRB, DRB, etc.). The PDCP entity circuitry 1744 may further be configured to execute PDCP entity software 1754 stored on the computer-readable medium 1706 to implement one or more functions described herein.

In some examples, the PDCP entity circuitry 1744 may be configured to calculate a current PDCP count (COUNT value or RCVD_COUNT) of a current PDCP PDU of the plurality of PDCP PDUs based on a PDCP sequence number (SN) of the current PDCP PDU and a hyper frame number (HFN) of a first missing PDCP PDU after a successfully received PDCP PDU of the plurality of PDCP PDUs. For example, the PDCP entity circuitry 1744 may be configured to calculate the PDCP count of the current PDCP PDU based on the PDCP SN of the current PDCU PDU and the HFN of the first missing PDCP PDU in response to a gap between a missing PDCP count (RX_DELIV 1716) of the first missing PDCP PDU and an actual PDCP count of the current PDCP PDU being greater than a PDCP window size (Window_Size 1718). The Window_Size 1718 may be a constant value that indicates the size of the reordering window corresponding to half of the PDCP SN space. For example, the Window_Size 1718 may be equal to 2048 when a 12-bit PDCP SN length is used. In some examples, the PDCP entity circuitry 1744 may update RX_DELIV 1716 with the missing PDCP count of the first missing PDCP PDU (e.g., the first PDCP SDU not delivered to upper layers) upon initiating a reordering timer (t_reordering).

In some examples, the wireless communication device may be operating in NR standalone mode. In this example, the PDCP entity circuitry 1744 may be configured to calculate the current PDCP count of the current PDCP PDU based on the HFN of the first missing PDCP PDU and a quotient of the gap and the PDCP window size. For example, each of the plurality of PDCP PDUs may be further associated with a respective RLC sequence number and the gap may correspond to an RLC SN gap between the respective RLC SN of the first missing PDCP PDU and the current PDCP PDU. In some examples, the PDCP entity circuitry 1744 may further be configured to perform a deciphering operation on the current PDCP PDU based on the current PDCP count in response to the current PDCP count being greater than or equal to the missing PDCP count (RX_DELIV 1716) of the first missing PDCP PDU.

In some examples, the PDCP entity circuitry 1744 may be configured to calculate a new PDCP count of the current PDCP PDU in response to the current PDCP count being less than the missing PDCP count (RX_DELIV 1716) of the first missing PDCP PDU. In this example, the PDCP entity circuitry 1744 may further be configured to perform a deciphering operation on the current PDCP PDU based on the new PDCP count in response to the new PDCP count being greater than or equal to the missing PDCP count (RX_DELIV 1716) of the first missing PDCP PDU and discard the PDCP PDU in response to the new PDCP count being less than the missing PDCP count (RX_DELIV 1716) of the first missing PDCP PDU.

In some examples, the wireless communication device may be operating in DC mode, such as EN-DC or NR DC. In an example in which the wireless communication device is operating in EN-DC mode, the plurality of PDCP PDUs may include a first subset of PDCP PDUs associated with a first radio access technology (RAT) and received from a first RLC entity (e.g., an LTE RLC entity) and a second subset of PDCP PDUs associated with a second RAT and received from a second RLC entity (e.g., a NR RLC entity), and the current PDCP PDU is within the first subset of PDCP PDUs. In this example, the PDCP entity circuitry 1744 may maintain a respective RLC entity HFN 1720 for each of the RLC entities (e.g., LTE and NR). For example, a first RLC entity HFN (e.g., first HFN) 1720 may be associated with the first subset of PDCP PDUs and a second RLC entity HFN (e.g., second HFN) 1720 may be associated with the second subset of PDCP PDUs.

In some examples, the PDCP entity circuitry 1744 may be configured to update a current HFN of the current PDCP PDU to the first HFN and calculate the current PDCP count of the current PDCP PDU based on the first HFN and the PDCP SN of the current PDCP PDU. The PDCP entity circuitry 1744 may then be configured to perform a deciphering operation on the current PDCP PDU based on the current PDCP count in response to the current PDCP count being greater than or equal to the missing PDCP count (RX_DELIV 1716) of the first missing PDCP PDU and transmit a PDCP SDU corresponding to the PDCP PDU to upper layers upon successfully deciphering the PDCP PDU using the first HFN. If the current PDCP PDU is not successfully deciphered using the first HFN, the PDCP entity circuitry 1744 may discard the current PDCP PDU.

In some examples, the PDCP entity circuitry 1744 may further be configured to update the current HFN of the current PDCP PDU to the second HFN in response to the current PDCP count being less than the missing PDCP count (RX_DELIV 1716) of the first missing PDCP PDU. The PDCP entity circuitry 1744 may then further be configured to calculate a new PDCP count of the current PDCP PDU based on the second HFN and the PDCP SN of the current PDCP PDU. The PDCP entity circuitry 1744 may then be configured to perform a deciphering operation on the current PDCP PDU based on the new PDCP count in response to the current PDCP count being greater than or equal to the missing PDCP count (RX_DELIV 1716) of the first missing PDCP PDU and transmit a PDCP SDU corresponding to the PDCP PDU to upper layers upon successfully deciphering the PDCP PDU using the first HFN. If the current PDCP PDU is not successfully deciphered using the first HFN, the PDCP entity circuitry 1744 may discard the current PDCP PDU. In addition, the PDCP entity circuitry 1744 may further be configured to discard the current PDCP PDU in response to the new PDCP count being less than the missing PDCP count (RX_DELIV 1716) of the first missing PDCP PDU. The PDCP entity circuitry 1744 may further be configured to update the first HFN with the current HFN of the current PDCP in response to the current PDCP PDU not being discarded.

In some examples, the PDCP entity circuitry 1744 may further be configured to calculate an initial PDCP count of the current PDCP PDU (e.g., using the existing COUNT algorithm discussed above). The PDCP entity circuitry 1744 may further be configured to perform a deciphering operation on the current PDCP PDU based on the initial PDCP count in response to the initial PDCP count being greater than or equal to the first missing PDCP count (RX_DELIV 1716) of the first missing PDCP PDU. The PDCP entity circuitry 1744 may further be configured to discard the current PDCP PDU in response to failure of the deciphering operation. In addition, the PDCP entity circuitry 1744 may be configured to calculate the current PDCP count of the current PDCP PDU in response to the initial PDCP count of the current PDCP PDU being less than the missing PDCP count (RX_DELIV 1716) of the first missing PDCP PDU.

Figure 18:
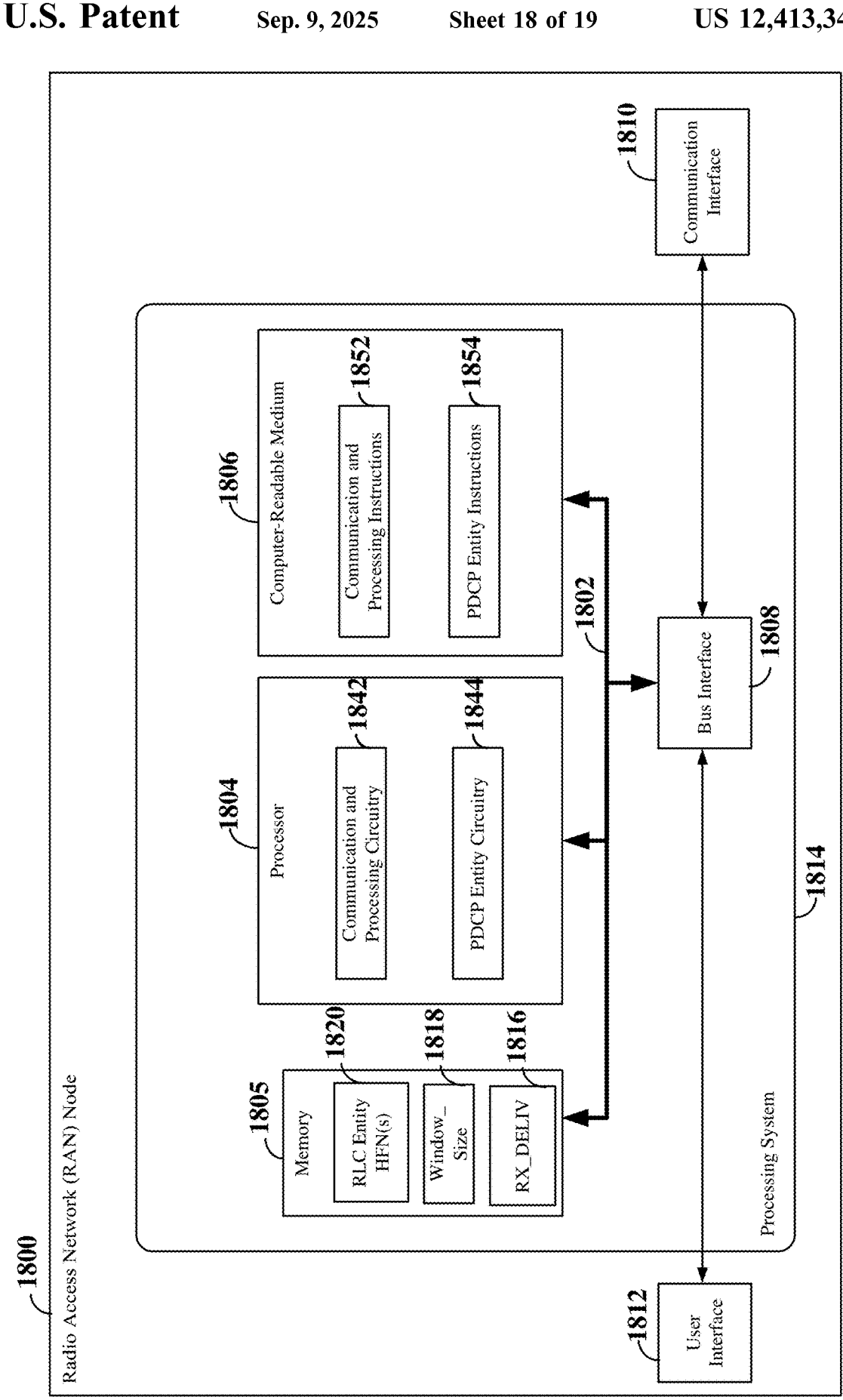
FIG. 18 is a block diagram illustrating an example of a hardware implementation for a radio access network (RAN) node employing a processing system according to some aspects.

FIG. 18 is a block diagram illustrating an example of a hardware implementation of a radio access network (RAN) node 1800 employing a processing system 1814 according to some aspects. The RAN node 1800 may be, for example, any base station (e.g., gNB, eNB) or other scheduling entity as illustrated in any one or more of FIGS. 1, 2, 4, and/or 5. The RAN node 1800 may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

In accordance with various aspects of the disclosure, an element, or any portion of an element, or any combination of elements may be implemented with a processing system 1814 that includes one or more processors, such as processor 1804. The processing system 1814 may be substantially the same as the processing system 1714 as shown and described above in connection with FIG. 17, including a bus interface 1808, a bus 1802, a memory 1805, a processor 1804, and a computer-readable medium 1806. Accordingly, their descriptions will not be repeated for the sake of brevity. Furthermore, the RAN node 1800 may include an optional user interface 1812 and a communication interface 1810 (e.g., wired or wireless), such as a transceiver or network interface.

The processor 1804, as utilized in the RAN node 1800, may be used to implement any one or more of the processes described below. In some examples, the memory 1805 may store an RX_DELIV 1816, a Window_Size 1818, and RLC entity HFN(s) 1820.

In some aspects of the disclosure, the processor 1804 may include communication and processing circuitry 1842 configured for various functions, including, for example, communicating with one or more UEs or other scheduled entities, or a core network node. In some examples, the communication and processing circuitry 1842 may communicate with one or more UEs via one or more TRPs associated with the RAN node 1800. In some examples (e.g., in an aggregated base station architecture), the communication and processing circuitry 1842 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1842 may be configured to process and transmit downlink traffic and downlink control and receive and process uplink traffic and uplink control. The communication and processing circuitry 1842 may further be configured to execute communication and processing software 1852 stored on the computer-readable medium 1806 to implement one or more functions described herein.

The processor 1804 may further include PDCP entity circuitry 1844, configured to receive a plurality of PDCP PDUs from one or more RLC entities within an RLC sublayer of the RAN node 1800 and process the PDCP PDUs for transmission to upper layers. The PDCP entity circuitry 1844 may correspond, for example, to the PDCP entity 900 shown in FIG. 9, the PDCP entity 1100 shown in FIG. 11, the PDCP entity 1200 shown in FIG. 12, and/or the PDCP entity 1300 shown in FIG. 13. The PDCP entity circuitry 1844 may be associated, for example, with a single radio bearer (e.g., SRB, DRB, etc.). The PDCP entity circuitry 1844 may further be configured to execute PDCP entity software 1854 stored on the computer-readable medium 1806 to implement one or more functions described herein.

In some examples, the PDCP entity circuitry 1844 may be configured to calculate a current PDCP count (COUNT value or RCVD_COUNT) of a current PDCP PDU of the plurality of PDCP PDUs based on a PDCP sequence number (SN) of the current PDCP PDU and a hyper frame number (HFN) of a first missing PDCP PDU after a successfully received PDCP PDU of the plurality of PDCP PDUs. For example, the PDCP entity circuitry 1844 may be configured to calculate the PDCP count of the current PDCP PDU based on the PDCP SN of the current PDCU PDU and the HFN of the first missing PDCP PDU in response to a gap between a missing PDCP count (RX_DELIV 1816) of the first missing PDCP PDU and an actual PDCP count of the current PDCP PDU being greater than a PDCP window size (Window_Size 1818). The Window_Size 1818 may be a constant value that indicates the size of the reordering window corresponding to half of the PDCP SN space. For example, the Window_Size 1818 may be equal to 2048 when a 12-bit PDCP SN length is used. In some examples, the PDCP entity circuitry 1844 may update RX_DELIV 1816 with the missing PDCP count of the first missing PDCP PDU (e.g., the first PDCP SDU not delivered to upper layers) upon initiating a reordering timer (t_reordering).

In some examples, the wireless communication device may be operating in NR standalone mode. In this example, the PDCP entity circuitry 1844 may be configured to calculate the current PDCP count of the current PDCP PDU based on the HFN of the first missing PDCP PDU and a quotient of the gap and the PDCP window size. For example, each of the plurality of PDCP PDUs may be further associated with a respective RLC sequence number and the gap may correspond to an RLC SN gap between the respective RLC SN of the first missing PDCP PDU and the current PDCP PDU. In some examples, the PDCP entity circuitry 1844 may further be configured to perform a deciphering operation on the current PDCP PDU based on the current PDCP count in response to the current PDCP count being greater than or equal to the missing PDCP count (RX_DELIV 1816) of the first missing PDCP PDU.

In some examples, the PDCP entity circuitry 1844 may be configured to calculate a new PDCP count of the current PDCP PDU in response to the current PDCP count being less than the missing PDCP count (RX_DELIV 1816) of the first missing PDCP PDU. In this example, the PDCP entity circuitry 1844 may further be configured to perform a deciphering operation on the current PDCP PDU based on the new PDCP count in response to the new PDCP count being greater than or equal to the missing PDCP count (RX_DELIV 1816) of the first missing PDCP PDU and discard the PDCP PDU in response to the new PDCP count being less than the missing PDCP count (RX_DELIV 1816) of the first missing PDCP PDU.

In some examples, the wireless communication device may be operating in DC mode, such as EN-DC or NR DC. In an example in which the wireless communication device is operating in EN-DC mode, the plurality of PDCP PDUs may include a first subset of PDCP PDUs associated with a first radio access technology (RAT) and received from a first RLC entity (e.g., an LTE RLC entity) and a second subset of PDCP PDUs associated with a second RAT and received from a second RLC entity (e.g., a NR RLC entity), and the current PDCP PDU is within the first subset of PDCP PDUs. In this example, the PDCP entity circuitry 1844 may maintain a respective RLC entity HFN 1820 for each of the RLC entities (e.g., LTE and NR). For example, a first RLC entity HFN (e.g., first HFN) 1820 may be associated with the first subset of PDCP PDUs and a second RLC entity HFN (e.g., second HFN) 1820 may be associated with the second subset of PDCP PDUS.

In some examples, the PDCP entity circuitry 1844 may be configured to update a current HFN of the current PDCP PDU to the first HFN and calculate the current PDCP count of the current PDCP PDU based on the first HFN and the PDCP SN of the current PDCP PDU. The PDCP entity circuitry 1844 may then be configured to perform a deciphering operation on the current PDCP PDU based on the current PDCP count in response to the current PDCP count being greater than or equal to the missing PDCP count (RX_DELIV 1816) of the first missing PDCP PDU and transmit a PDCP SDU corresponding to the PDCP PDU to upper layers upon successfully deciphering the PDCP PDU using the first HFN. If the current PDCP PDU is not successfully deciphered using the first HFN, the PDCP entity circuitry 1844 may discard the current PDCP PDU.

In some examples, the PDCP entity circuitry 1844 may further be configured to update the current HFN of the current PDCP PDU to the second HFN in response to the current PDCP count being less than the missing PDCP count (RX_DELIV 1816) of the first missing PDCP PDU. The PDCP entity circuitry 1844 may then further be configured to calculate a new PDCP count of the current PDCP PDU based on the second HFN and the PDCP SN of the current PDCP PDU. The PDCP entity circuitry 1844 may then be configured to perform a deciphering operation on the current PDCP PDU based on the new PDCP count in response to the current PDCP count being greater than or equal to the missing PDCP count (RX_DELIV 1816) of the first missing PDCP PDU and transmit a PDCP SDU corresponding to the PDCP PDU to upper layers upon successfully deciphering the PDCP PDU using the first HFN. If the current PDCP PDU is not successfully deciphered using the first HFN, the PDCP entity circuitry 1844 may discard the current PDCP PDU. In addition, the PDCP entity circuitry 1844 may further be configured to discard the current PDCP PDU in response to the new PDCP count being less than the missing PDCP count (RX_DELIV 1816) of the first missing PDCP PDU. The PDCP entity circuitry 1844 may further be configured to update the first HFN with the current HFN of the current PDCP in response to the current PDCP PDU not being discarded.

In some examples, the PDCP entity circuitry 1844 may further be configured to calculate an initial PDCP count of the current PDCP PDU (e.g., using the existing COUNT algorithm discussed above). The PDCP entity circuitry 1844 may further be configured to perform a deciphering operation on the current PDCP PDU based on the initial PDCP count in response to the initial PDCP count being greater than or equal to the first missing PDCP count (RX_DELIV 1816) of the first missing PDCP PDU. The PDCP entity circuitry 1844 may further be configured to discard the current PDCP PDU in response to failure of the deciphering operation. In addition, the PDCP entity circuitry 1844 may be configured to calculate the current PDCP count of the current PDCP PDU in response to the initial PDCP count of the current PDCP PDU being less than the missing PDCP count (RX_DELIV 1816) of the first missing PDCP PDU.

Figure 19:
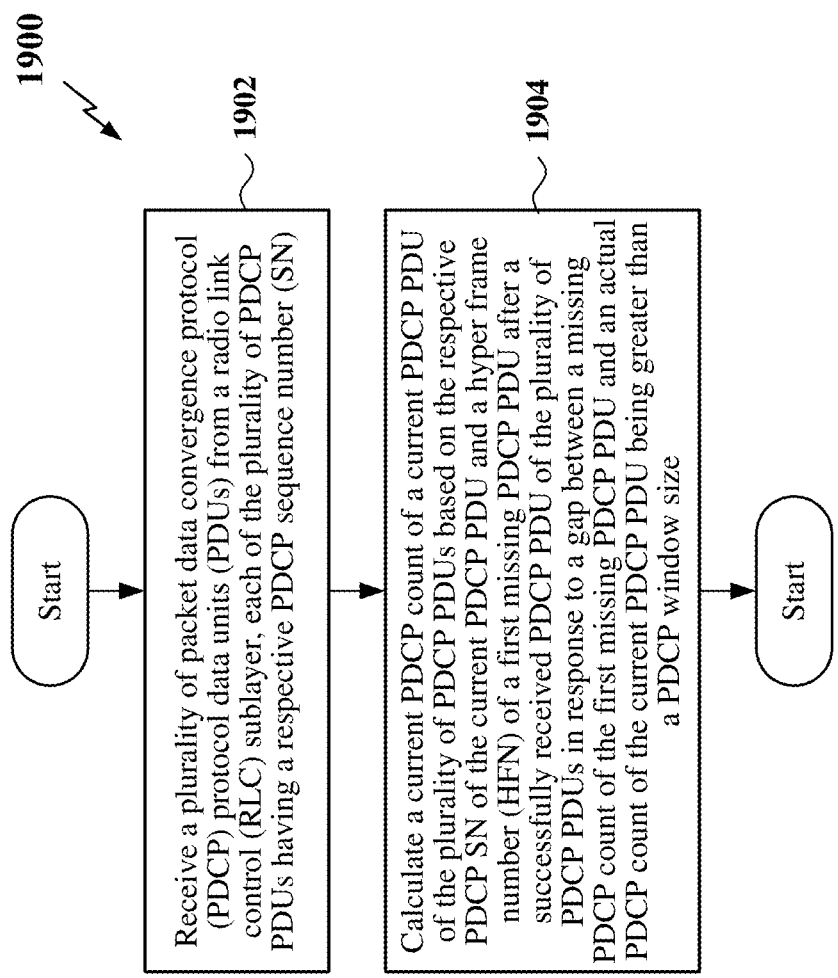
FIG. 19 is a diagram illustrating an exemplary method for HFN resynchronization according to some aspects.

FIG. 19 is a flow chart illustrating an exemplary method for HFN resynchronization according to some aspects. As described below, some or all illustrated features may be omitted in a particular implementation within the scope of the present disclosure, and some illustrated features may not be required for implementation of all embodiments. In some examples, the method 1900 may be carried out by the wireless communication device 1700 illustrated in FIG. 17 or the RAN node 1800 illustrated in FIG. 18. In some examples, the method 1900 may be carried out by any suitable apparatus or means for carrying out the functions or algorithm described below. For simplicity, the method 1900 is described below as being implemented by the wireless communication device 1700 of FIG. 17.

At block 1902, the wireless communication device may receive a plurality of packet data convergence protocol (PDCP) protocol data units (PDUs) from a radio link control (RLC) sublayer. Each of the plurality of PDCP PDUs may include a respective PDCP sequence number (SN). In some examples, the plurality of PDCP PDUs includes a first subset of PDCP PDUs associated with a first radio access technology (RAT) and a second subset of PDCP PDUs associated with a second RAT. For example, the communication and processing circuitry 1742 together with the PDCP entity circuitry 1744 shown and described above in reference to FIG. 17, may provide a means to receive the PDCP PDUs.

At block 1904, the wireless communication device may calculate a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

In some examples, the wireless communication device may calculate the current PDCP count of the current PDCP PDU based on the HFN of the first missing PDCP PDU and a quotient of the gap and the PDCP window size. In some examples, the wireless communication device may further perform a deciphering operation on the current PDCP PDU based on the current PDCP count in response to the current PDCP count being greater than or equal to the missing PDCP count of the first missing PDCP PDU. In some examples, the wireless communication device may calculate a new PDCP count of the current PDCP PDU in response to the current PDCP count being less than the missing PDCP count of the first missing PDCP PDU. In this example, the wireless communication device may further perform a deciphering operation on the current PDCP PDU based on the new PDCP count in response to the new PDCP count being greater than or equal to the missing PDCP count of the first missing PDCP PDU and discard the PDCP PDU in response to the new PDCP count being less than the missing PDCP count of the first missing PDCP PDU.

In some examples, the current PDCP PDU is within the first subset of PDCP PDUs. In this example, the wireless communication device may maintain a first HFN associated with the first subset of PDCP PDUs and maintain a second HFN associated with the second subset of PDCP PDUs. The wireless communication device may further update a current HFN of the current PDCP PDU to the first HFN and calculate the current PDCP count of the current PDCP PDU based on the first HFN and the respective PDCP SN of the current PDCP PDU. In some examples, the wireless communication device may further perform a deciphering operation on the current PDCP PDU based on the current PDCP count in response to the current PDCP count being greater than or equal to the missing PDCP count of the first missing PDCP PDU and discard the current PDCP PDU in response to the current PDCP count being less than the missing PDCP count of the first missing PDCP PDU.

In some examples, the wireless communication device may further update the current HFN of the current PDCP PDU to the second HFN in response to the current PDCP count being less than the missing PDCP count of the first missing PDCP PDU and calculate a new PDCP count of the current PDCP PDU based on the second HFN and the respective PDCP SN of the current PDCP PDU. In this example, the wireless communication device may further perform a deciphering operation on the current PDCP PDU based on the new PDCP count in response to the current PDCP count being greater than or equal to the missing PDCP count of the first missing PDCP PDU and discard the current PDCP PDU in response to the new PDCP count being less than the missing PDCP count of the first missing PDCP PDU. The wireless communication device may further update the first HFN with the current HFN of the current PDCP PDU in response to the current PDCP PDU not being discarded.

In some examples, the wireless communication device may calculate an initial PDCP count of the current PDCP PDU. The wireless communication device may further perform a deciphering operation on the current PDCP PDU based on the initial PDCP count in response to the initial PDCP count being greater than or equal to the first missing PDCP count of the first missing PDCP PDU and discard the current PDCP PDU in response to failure of the deciphering operation. The wireless communication device may further calculate the current PDCP count of the current PDCP PDU in response to the initial PDCP count of the current PDCP PDU being less than the missing PDCP count of the first missing PDCP PDU.

In one configuration, the wireless communication device includes means for receiving a plurality of packet data convergence protocol (PDCP) protocol data units (PDUs) from a radio link control (RLC) sublayer, each of the plurality of PDCP PDUs comprising a respective PDCP sequence number (SN), and means for calculating a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size. In one aspect, the aforementioned means may be the processor 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1, 2, 4, and/or 5, and utilizing, for example, the processes and/or algorithms described herein in relation to FIGS. 14-16 and 19.

The following provides an overview of aspects of the present disclosure:

Aspect 1: A method for wireless communication at a wireless communication device, the method comprising: receiving a plurality of packet data convergence protocol (PDCP) protocol data units (PDUs) from a radio link control (RLC) sublayer, each of the plurality of PDCP PDUs comprising a respective PDCP sequence number (SN); and calculating a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

Aspect 2: The method of aspect 1, wherein each of the plurality of PDCP PDUs is further associated with a respective RLC sequence number (SN) and further comprising: determining an RLC SN gap between the respective RLC SN of the successfully received PDCP PDU and the current PDCP PDU.

Aspect 3: The method of aspect 2, wherein the calculating the current PDCP count of the current PDCP PDU further comprises: calculating the current PDCP count of the current PDCP PDU based on the HFN of the first missing PDCP PDU and a quotient of the RLC SN gap and the PDCP window size.

Aspect 4: The method of aspect 3, further comprising: performing a deciphering operation on the current PDCP PDU based on the current PDCP count in response to the current PDCP count being greater than or equal to the missing PDCP count of the first missing PDCP PDU.

Aspect 5: The method of aspect 3 or 4, further comprising: calculating a new PDCP count of the current PDCP PDU in response to the current PDCP count being less than the missing PDCP count of the first missing PDCP PDU; performing a deciphering operation on the current PDCP PDU based on the new PDCP count in response to the new PDCP count being greater than or equal to the missing PDCP count of the first missing PDCP PDU; and discarding the PDCP PDU in response to the new PDCP count being less than the missing PDCP count of the first missing PDCP PDU.

Aspect 6: The method of aspect 1, wherein the plurality of PDCP PDUs comprises a first subset of PDCP PDUs associated with a first radio access technology (RAT) and a second subset of PDCP PDUs associated with a second RAT, and the current PDCP PDU is within the first subset of PDCP PDUs, and further comprising: maintaining a first HFN associated with the first subset of PDCP PDUs; and maintaining a second HFN associated with the second subset of PDCP PDUs.

Aspect 7: The method of aspect 6, wherein the calculating the PDCP count of the current PDCP PDU comprises: updating a current HFN of the current PDCP PDU to the first HFN; and calculating the current PDCP count of the current PDCP PDU based on the first HFN and the respective PDCP SN of the current PDCP PDU.

Aspect 8: The method of aspect 7, further comprising: performing a deciphering operation on the current PDCP PDU based on the current PDCP count in response to the current PDCP count being greater than or equal to the missing PDCP count of the first missing PDCP PDU.

Aspect 9: The method of aspect 7 or 8, wherein the calculating the PDCP count of the current PDCP PDU further comprises: updating the current HFN of the current PDCP PDU to the second HFN in response to the current PDCP count being less than the missing PDCP count of the first missing PDCP PDU; and calculating a new PDCP count of the current PDCP PDU based on the second HFN and the respective PDCP SN of the current PDCP PDU.

Aspect 10: The method of aspect 9, further comprising: performing a deciphering operation on the current PDCP PDU based on the new PDCP count in response to the current PDCP count being greater than or equal to the missing PDCP count of the first missing PDCP PDU; and discarding the current PDCP PDU in response to the new PDCP count being less than the missing PDCP count of the first missing PDCP PDU.

Aspect 11: The method of any of aspects 1 through 10, further comprising: updating the first HFN with the current HFN of the current PDCP PDU in response to the current PDCP PDU not being discarded.

Aspect 12: The method of any of aspect 1 through 11, wherein the calculating the current PDCP count of the current PDCP PDU further comprising: calculating an initial PDCP count of the current PDCP PDU; performing a deciphering operation on the current PDCP PDU based on the initial PDCP count in response to the initial PDCP count being greater than or equal to the missing PDCP count of the first missing PDCP PDU; discarding the current PDCP PDU in response to failure of the deciphering operation; and calculating the current PDCP count of the current PDCP PDU in response to the initial PDCP count of the current PDCP PDU being less than the missing PDCP count of the first missing PDCP PDU.

Aspect 13: A wireless communication device configured for wireless communication comprising a memory and a processor coupled to the memory, the processor and the memory being configured to perform a method of any one of aspects 1-12.

Aspect 14: A wireless communication device configured for wireless communication comprising means for performing a method of any one of aspects 1-12.

Aspect 15: A non-transitory computer-readable medium having stored therein instructions executable by one or more processors of a wireless communication device to perform a method of any one of aspects 1-12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 17, and/or 18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

What is claimed is:

1. A wireless communication device configured for wireless communication, comprising:
 a memory; and
 a processor coupled to the memory, the processor and the memory configured to:
   receive a plurality of packet data convergence protocol (PDCP) protocol data units (PDUs) from a radio link control (RLC) sublayer, each of the plurality of PDCP PDUs comprising a respective PDCP sequence number (SN); and calculate a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

2. The wireless communication device of claim 1, wherein each of the plurality of PDCP PDUs is further associated with a respective RLC sequence number (SN) and wherein the processor and the memory are further configured to:

determine an RLC SN gap between the respective RLC SN of the successfully received PDCP PDU and the current PDCP PDU.

3. The wireless communication device of claim 2, wherein the processor and the memory are further configured to:

calculate the current PDCP count of the current PDCP PDU based on the HFN of the first missing PDCP PDU and a quotient of the RLC SN gap and the PDCP window size.

4. The wireless communication device of claim 3, wherein the processor and the memory are further configured to:

perform a deciphering operation on the current PDCP PDU based on the current PDCP count in response to the current PDCP count being greater than or equal to the missing PDCP count of the first missing PDCP PDU.

5. The wireless communication device of claim 3, wherein the processor and the memory are further configured to:

calculate a new PDCP count of the current PDCP PDU in response to the current PDCP count being less than the missing PDCP count of the first missing PDCP PDU;

perform a deciphering operation on the current PDCP PDU based on the new PDCP count in response to the new PDCP count being greater than or equal to the missing PDCP count of the first missing PDCP PDU; and discard the current PDCP PDU in response to the new PDCP count being less than the missing PDCP count of the first missing PDCP PDU.

6. The wireless communication device of claim 1, wherein the plurality of PDCP PDUs comprises a first subset of PDCP PDUs associated with a first radio access technology (RAT) and a second subset of PDCP PDUs associated with a second RAT, and the current PDCP PDU is within the first subset of PDCP PDUs, and wherein the processor and the memory are further configured to:

maintain a first HFN associated with the first subset of PDCP PDUs; and maintain a second HFN associated with the second subset of PDCP PDUs.

7. The wireless communication device of claim 6, wherein the processor and the memory are further configured to:

update a current HFN of the current PDCP PDU to the first HFN; and calculate the current PDCP count of the current PDCP PDU based on the first HFN and the respective PDCP SN of the current PDCP PDU.

8. The wireless communication device of claim 7, wherein the processor and the memory are further configured to:

perform a deciphering operation on the current PDCP PDU based on the current PDCP count in response to the current PDCP count being greater than or equal to the missing PDCP count of the first missing PDCP PDU.

9. The wireless communication device of claim 7, wherein the processor and the memory are further configured to:

update the current HFN of the current PDCP PDU to the second HFN in response to the current PDCP count being less than the missing PDCP count of the first missing PDCP PDU; and calculate a new PDCP count of the current PDCP PDU based on the second HFN and the respective PDCP SN of the current PDCP PDU.

10. The wireless communication device of claim 9, wherein the processor and the memory are further configured to:

perform a deciphering operation on the current PDCP PDU based on the new PDCP count in response to the current PDCP count being greater than or equal to the missing PDCP count of the first missing PDCP PDU; and discard the current PDCP PDU in response to the new PDCP count being less than the missing PDCP count of the first missing PDCP PDU.

11. The wireless communication device of claim 10, wherein the processor and the memory are further configured to:

update the first HFN with the current HFN of the current PDCP PDU in response to the current PDCP PDU not being discarded.

12. The wireless communication device of claim 6, wherein the processor and the memory are further configured to:

calculate an initial PDCP count of the current PDCP PDU;

perform a deciphering operation on the current PDCP PDU based on the initial PDCP count in response to the initial PDCP count being greater than or equal to the missing PDCP count of the first missing PDCP PDU;

discard the current PDCP PDU in response to failure of the deciphering operation; and calculate the current PDCP count of the current PDCP PDU in response to the initial PDCP count of the current PDCP PDU being less than the missing PDCP count of the first missing PDCP PDU.

13. A method for wireless communication at a wireless communication device, the method comprising:

receiving a plurality of packet data convergence protocol (PDCP) protocol data units (PDUs) from a radio link control (RLC) sublayer, each of the plurality of PDCP PDUs comprising a respective PDCP sequence number (SN); and calculating a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

14. The method of claim 13, wherein each of the plurality of PDCP PDUs is further associated with a respective RLC sequence number (SN) and further comprising:
   determining an RLC SN gap between the respective RLC SN of the successfully received PDCP PDU and the current PDCP PDU.

15. The method of claim 14, wherein the calculating the current PDCP count of the current PDCP PDU further comprises:
   calculating the current PDCP count of the current PDCP PDU based on the HEN of the first missing PDCP PDU and a quotient of the RLC SN gap and the PDCP window size.

16. The method of claim 15, further comprising:
   performing a deciphering operation on the current PDCP PDU based on the current PDCP count in response to the current PDCP count being greater than or equal to the missing PDCP count of the first missing PDCP PDU.

17. The method of claim 15, further comprising:
   calculating a new PDCP count of the current PDCP PDU in response to the current PDCP count being less than the missing PDCP count of the first missing PDCP PDU;
   performing a deciphering operation on the current PDCP PDU based on the new PDCP count in response to the new PDCP count being greater than or equal to the missing PDCP count of the first missing PDCP PDU; and
   discarding the current PDCP PDU in response to the new PDCP count being less than the missing PDCP count of the first missing PDCP PDU.

18. The method of claim 13, wherein the plurality of PDCP PDUs comprises a first subset of PDCP PDUs associated with a first radio access technology (RAT) and a second subset of PDCP PDUs associated with a second RAT, and the current PDCP PDU is within the first subset of PDCP PDUs, and further comprising:
   maintaining a first HFN associated with the first subset of PDCP PDUs; and
   maintaining a second HFN associated with the second subset of PDCP PDUs.

19. The method of claim 18, wherein the calculating the current PDCP count of the current PDCP PDU comprises:
   updating a current HFN of the current PDCP PDU to the first HFN; and
   calculating the current PDCP count of the current PDCP PDU based on the first HFN and the respective PDCP SN of the current PDCP PDU.

20. The method of claim 19, further comprising:
   performing a deciphering operation on the current PDCP PDU based on the current PDCP count in response to the current PDCP count being greater than or equal to the missing PDCP count of the first missing PDCP PDU.

21. The method of claim 19, wherein the calculating the current PDCP count of the current PDCP PDU further comprises:
   updating the current HFN of the current PDCP PDU to the second HFN in response to the current PDCP count being less than the missing PDCP count of the first missing PDCP PDU; and
   calculating a new PDCP count of the current PDCP PDU based on the second HFN and the respective PDCP SN of the current PDCP PDU.

22. The method of claim 21, further comprising:
   performing a deciphering operation on the current PDCP PDU based on the new PDCP count in response to the current PDCP count being greater than or equal to the missing PDCP count of the first missing PDCP PDU; and
   discarding the current PDCP PDU in response to the new PDCP count being less than the missing PDCP count of the first missing PDCP PDU.

23. The method of claim 22, further comprising:
   updating the first HFN with the current HFN of the current PDCP PDU in response to the current PDCP PDU not being discarded.

24. The method of claim 18, wherein the calculating the current PDCP count of the current PDCP PDU further comprising:
   calculating an initial PDCP count of the current PDCP PDU;
   performing a deciphering operation on the current PDCP PDU based on the initial PDCP count in response to the initial PDCP count being greater than or equal to the missing PDCP count of the first missing PDCP PDU;
   discarding the current PDCP PDU in response to failure of the deciphering operation; and
   calculating the current PDCP count of the current PDCP PDU in response to the initial PDCP count of the current PDCP PDU being less than the missing PDCP count of the first missing PDCP PDU.

25. A wireless communication device configured for wireless communication, comprising:
   means for receiving a plurality of packet data convergence protocol (PDCP) protocol data units (PDUs) from a radio link control (RLC) sublayer, each of the plurality of PDCP PDUs comprising a respective PDCP sequence number (SN); and
   means for calculating a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

26. The wireless communication device of claim 24, further comprising:
   means for determining an RLC SN gap between a respective RLC SN of the successfully received PDCP PDU and the current PDCP PDU; and
   means for calculating the current PDCP count of the current PDCP PDU based on the HFN of the first missing PDCP PDU and a quotient of the RLC SN gap and the PDCP window size;
   means for calculating a new PDCP count of the current PDCP PDU in response to the current PDCP count being less than the missing PDCP count of the first missing PDCP PDU;
   means for performing a deciphering operation on the current PDCP PDU based on the new PDCP count in response to the new PDCP count being greater than or equal to the missing PDCP count of the first missing PDCP PDU; and
   means for discarding the current PDCP PDU in response to the new PDCP count being less than the missing PDCP count of the first missing PDCP PDU.

27. The wireless communication device of claim 25, wherein the plurality of PDCP PDUs comprises a first subset of PDCP PDUs associated with a first radio access technology (RAT) and a second subset of PDCP PDUs associated with a second RAT, and the current PDCP PDU is within the first subset of PDCP PDUs, and further comprising:

means for maintaining a first HFN associated with the first subset of PDCP PDUs;

means for maintaining a second HFN associated with the second subset of PDCP PDUs; and means for updating the first HFN with the current HFN of the current PDCP PDU in response to the current PDCP PDU not being discarded.

28. The wireless communication device of claim 27, further comprising:

means for updating a current HFN of the current PDCP PDU to the first HFN;

means for calculating the current PDCP count of the current PDCP PDU based on the first HFN and the respective PDCP SN of the current PDCP PDU;

means for updating the current HFN of the current PDCP PDU to the second HFN in response to the current PDCP count being less than the missing PDCP count of the first missing PDCP PDU;

means for calculating a new PDCP count of the current PDCP PDU based on the second HFN and the respective PDCP SN of the current PDCP PDU; and means for discarding the current PDCP PDU in response to the new PDCP count being less than the missing PDCP count of the first missing PDCP PDU.

29. The wireless communication device of claim 27, further comprising:

means for calculating an initial PDCP count of the current PDCP PDU;

means for performing a deciphering operation on the current PDCP PDU based on the initial PDCP count in response to the initial PDCP count being greater than or equal to the missing PDCP count of the first missing PDCP PDU;

means for discarding the current PDCP PDU in response to failure of the deciphering operation; and means for calculating the current PDCP count of the current PDCP PDU in response to the initial PDCP count of the current PDCP PDU being less than the missing PDCP count of the first missing PDCP PDU.

30. A non-transitory computer-readable medium having stored therein instructions executable by one or more processors of a wireless communication device to:

receive a plurality of packet data convergence protocol (PDCP) protocol data units (PDUs) from a radio link control (RLC) sublayer, each of the plurality of PDCP PDUs comprising a respective PDCP sequence number (SN); and calculate a current PDCP count of a current PDCP PDU of the plurality of PDCP PDUs based on the respective PDCP SN of the current PDCP PDU and a hyper frame number (HFN) of a first missing PDCP PDU after a successfully received PDCP PDU of the plurality of PDCP PDUs in response to a gap between a missing PDCP count of the first missing PDCP PDU and an actual PDCP count of the current PDCP PDU being greater than a PDCP window size.

* * * * *